(12) United States Patent
Wassvik et al.

(10) Patent No.: US 8,890,843 B2
(45) Date of Patent: Nov. 18, 2014

(54) DETECTING THE LOCATION OF AN OBJECT ON A TOUCH SURFACE

(75) Inventors: Ola Wassvik, Brösarp (SE); Tomas Christiansson, Torna-Hällestad (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 12/737,018

(22) PCT Filed: Jun. 22, 2009

(86) PCT No.: PCT/EP2009/057725
§ 371 (c)(1),
(2), (4) Date: Dec. 2, 2010

(87) PCT Pub. No.: WO2010/006884
PCT Pub. Date: Jan. 21, 2010

(65) Prior Publication Data
US 2011/0074734 A1  Mar. 31, 2011

Related U.S. Application Data

(60) Provisional application No. 61/202,875, filed on Apr. 15, 2009, provisional application No. 61/129,372, filed on Jun. 23, 2008, provisional application No. 61/129,373, filed on Jun. 23, 2008.

(30) Foreign Application Priority Data

Jun. 23, 2008 (SE) ........................... 0801466
Jun. 23, 2008 (SE) ........................... 0801467
Apr. 15, 2009 (SE) ........................... 0950245

(51) Int. Cl.
| | | |
|---|---|---|
| *G09G 5/00* | (2006.01) | |
| *G06F 3/041* | (2006.01) | |
| *G06F 3/042* | (2006.01) | |
| *G06K 11/06* | (2006.01) | |
| *G08C 21/00* | (2006.01) | |
| *G01B 11/24* | (2006.01) | |
| *G01B 11/04* | (2006.01) | |
| *G02B 26/08* | (2006.01) | |
| *G02B 26/10* | (2006.01) | |
| *G02B 26/12* | (2006.01) | |

(52) U.S. Cl.
CPC .... *G06F 3/0423* (2013.01); *G06F 2203/04109* (2013.01)

USPC ........ 345/175; 345/156; 345/173; 178/18.01; 178/18.09; 178/18.11; 356/606; 356/607; 356/608; 356/639; 359/202.1

(58) Field of Classification Search
USPC .................... 345/173–178; 178/18.01–18.11; 359/202.1–204.5; 356/399, 400, 601, 356/607, 608, 614, 621, 638–640
See application file for complete search history.

(56) References Cited

U.S. PATENT DOCUMENTS

| | | | |
|---|---|---|---|
| 3,553,680 A | 1/1971 | Cooreman | |
| 3,673,327 A * | 6/1972 | Johnson et al. | ............ 178/18.04 |

(Continued)

FOREIGN PATENT DOCUMENTS

| | | |
|---|---|---|
| CN | 1940841 | 4/2007 |
| CN | 101075168 | 11/2007 |

(Continued)

OTHER PUBLICATIONS

Liu J., et al., "Multiple touch points identifying method, involves starting touch screen, driving specific emission tube, and computing and transmitting coordinate of touch points to computer system by direct lines through interface of touch screen", vol. 2008, No. 28, Nov. 21, 2007.

(Continued)

*Primary Examiner* — Ilana Spar
(74) *Attorney, Agent, or Firm* — Harness, Dickey & Pierce, P.L.C.

(57) ABSTRACT

An apparatus is operated to determine the location of at least one object on a touch surface of a light transmissive panel. In the apparatus, an illumination arrangement introduces radiation into the panel for propagation by internal reflection between the touch surface and the opposite surface, so as to generate a grid of intersecting radiation paths in a sensing area, and a detection arrangement measures the transmitted energy in the radiation paths. A data processor then determines, based on the transmitted energy, the location based on an attenuation of two or more radiation paths caused by the object touching the touch surface within the sensing area. In the apparatus, the illumination arrangement generates at least a subset of the radiation paths by sweeping at least one beam of radiation along the touch surface. The detection arrangement comprises a fixed re-directing device which receives and re-directs the beam onto a common detection point while the beam is swept along the touch surface, and a radiation detector which is located at the common detection point to measure the energy of the beam(s).

29 Claims, 13 Drawing Sheets

(56) References Cited

U.S. PATENT DOCUMENTS

| | | | |
|---|---|---|---|
| 4,129,384 A * | 12/1978 | Walker et al. | 356/640 |
| 4,213,707 A * | 7/1980 | Evans, Jr. | 356/640 |
| 4,294,543 A | 10/1981 | Apple et al. | |
| 4,420,261 A * | 12/1983 | Barlow et al. | 356/621 |
| 4,507,557 A | 3/1985 | Tsikos | |
| 4,521,112 A * | 6/1985 | Kuwabara et al. | 356/621 |
| 4,746,770 A | 5/1988 | McAvinney | |
| 4,933,544 A * | 6/1990 | Tamaru | 250/221 |
| 5,383,022 A * | 1/1995 | Kaser | 356/640 |
| 5,570,181 A * | 10/1996 | Yasuo et al. | 356/336 |
| 5,764,223 A | 6/1998 | Chang et al. | |
| 6,492,633 B2 | 12/2002 | Nakazawa et al. | |
| 6,972,753 B1 | 12/2005 | Kimura et al. | |
| 7,176,904 B2 | 2/2007 | Satoh | |
| 7,629,968 B2 * | 12/2009 | Miller et al. | 345/173 |
| 8,218,154 B2 | 7/2012 | OStergaard et al. | |
| 2001/0002694 A1 | 6/2001 | Nakazawa et al. | |
| 2002/0067348 A1 | 6/2002 | Masters et al. | |
| 2003/0160155 A1 | 8/2003 | Liess | |
| 2004/0174541 A1 * | 9/2004 | Freifeld | 356/614 |
| 2004/0252091 A1 | 12/2004 | Ma et al. | |
| 2005/0128190 A1 | 6/2005 | Ryynanen | |
| 2005/0200613 A1 | 9/2005 | Kobayashi et al. | |
| 2006/0007185 A1 | 1/2006 | Kobayashi | |
| 2006/0017709 A1 | 1/2006 | Okano | |
| 2006/0114237 A1 | 6/2006 | Crockett et al. | |
| 2006/0139340 A1 | 6/2006 | Geaghan | |
| 2006/0227120 A1 | 10/2006 | Eikman | |
| 2007/0024598 A1 | 2/2007 | Miller et al. | |
| 2007/0052684 A1 | 3/2007 | Gruhlke et al. | |
| 2007/0070056 A1 | 3/2007 | Sato et al. | |
| 2007/0120833 A1 | 5/2007 | Yamaguchi et al. | |
| 2008/0068691 A1 * | 3/2008 | Miyatake | 359/204 |
| 2008/0252619 A1 | 10/2008 | Crockett et al. | |
| 2009/0135162 A1 | 5/2009 | Wijdeven et al. | |
| 2009/0219256 A1 | 9/2009 | Newton | |
| 2009/0273794 A1 * | 11/2009 | Ostergaard et al. | 356/614 |
| 2010/0045629 A1 | 2/2010 | Newton | |
| 2010/0066704 A1 | 3/2010 | Kasai | |
| 2010/0079407 A1 | 4/2010 | Suggs | |
| 2010/0193259 A1 | 8/2010 | Wassvik | |

FOREIGN PATENT DOCUMENTS

| | | |
|---|---|---|
| EP | 0 897 161 | 2/1999 |
| EP | 1 752 864 | 2/2007 |
| GB | 2 131 544 | 6/1984 |
| JP | 02-155023 | 6/1990 |
| JP | 2005-346503 | 12/2005 |
| JP | 2007-128497 | 5/2007 |
| RU | 2072513 | 1/1997 |
| WO | WO 01/84251 | 11/2001 |
| WO | WO 2006/095320 | 9/2006 |
| WO | WO 2007/112742 | 10/2007 |
| WO | WO 2008/039006 | 4/2008 |
| WO | WO 2008/066004 | 6/2008 |
| WO | WO 2008/068607 | 6/2008 |
| WO | WO 2009/048365 | 4/2009 |
| WO | WO 2010/006882 | 1/2010 |
| WO | WO 2010/006883 | 1/2010 |
| WO | WO 2010/006885 | 1/2010 |

OTHER PUBLICATIONS

International Search Report dated Jan. 4, 2011 for International application No. PCT/EP2009/057731.
International Search Report dated Oct. 7, 2011 for International application No. PCT/EP2009/057725.
International Search Report dated Oct. 15, 2010 for International application No. PCT/EP2009/057724.
International Search Report dated Oct. 7, 2010 for International application No. PCT/EP2009/057728.
International Search Report dated Feb. 11, 2010 for International application No. PCT/EP2009/057723.
U.S. Office Action dated Apr. 2, 2012 issued in U.S. Appl. No. 12/737,019.
U.S. Office Action dated Feb. 11, 2013, issued in U.S. Appl. No. 12/737,017.
English Translation of Chinese Search Report dated Oct. 29, 2012, issued in Chinese Application No. 2009801237168.
English Translation of Chinese Search Report dated Jan. 4, 2013, issued in Chinese Application No. 2009801237172.
Notice of Allowance dated Feb. 22, 2013, issued in U.S. Appl. No. 12/737,016.
U.S. Office Action dated Feb. 28, 2013 issued in U.S. Appl. No. 12/737,019.
U.S. Office Action dated Aug. 24, 2012 issued in U.S. Appl. No. 12/737,016.
U.S. Office Action dated Jul. 14, 2014 issued in U.S. Appl. No. 12/737,020.
Chinese Office Action dated Sep. 3, 2013 issued in Chinese Application No. 200980123717.2.
Russian Office Action dated Jul. 12, 2013 issued in Russian Application No. 2010151557/08 and English translation thereof.
Japanese Office Action dated Sep. 3, 2013 issued in corresponding Japanese Application No. 2011-514058 and English translation thereof.
U.S. Office Action dated Oct. 24, 2013, issued in U.S. Appl. No. 12/737,020.
U.S. Office Action dated Aug. 20, 2013, issued in U.S. Appl. No. 12/737,017.

* cited by examiner

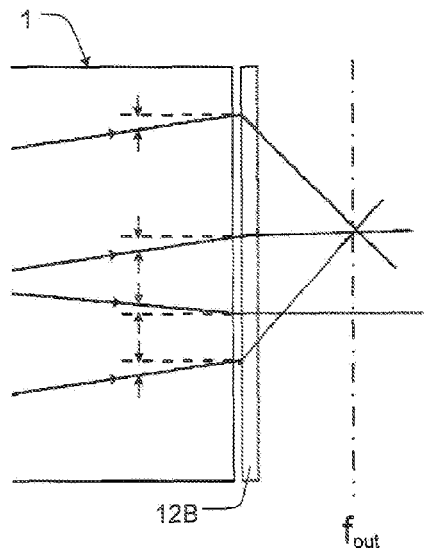
FIG. 2A
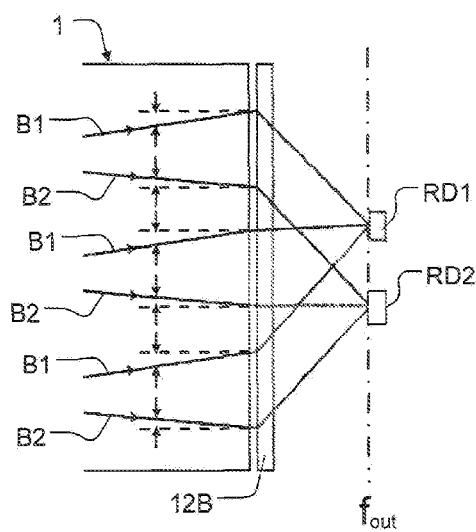
FIG. 2B
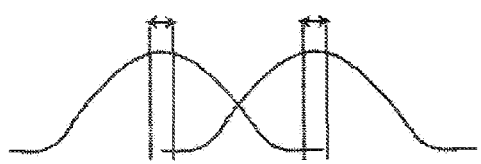
FIG. 3A
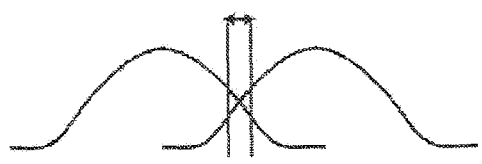
FIG. 3B
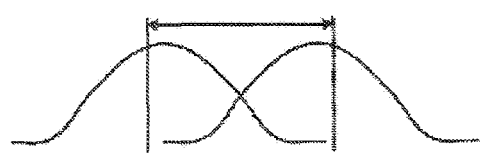
FIG. 3C
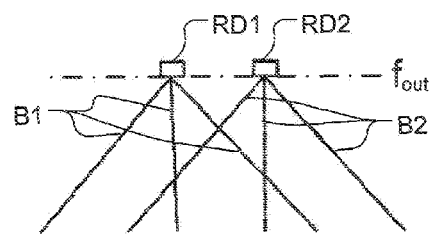
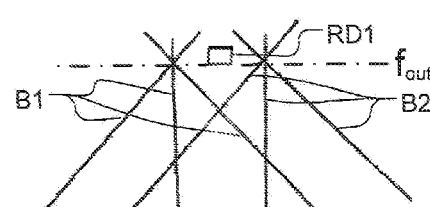
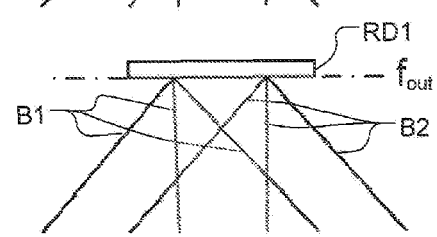

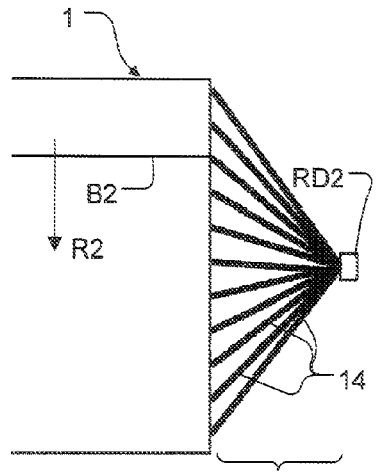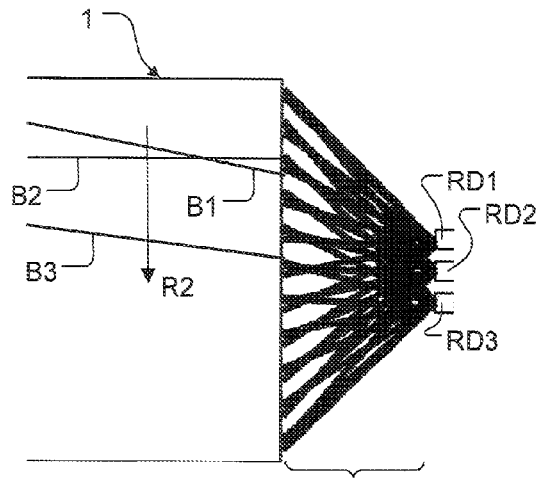
FIG. 4A   FIG. 4B
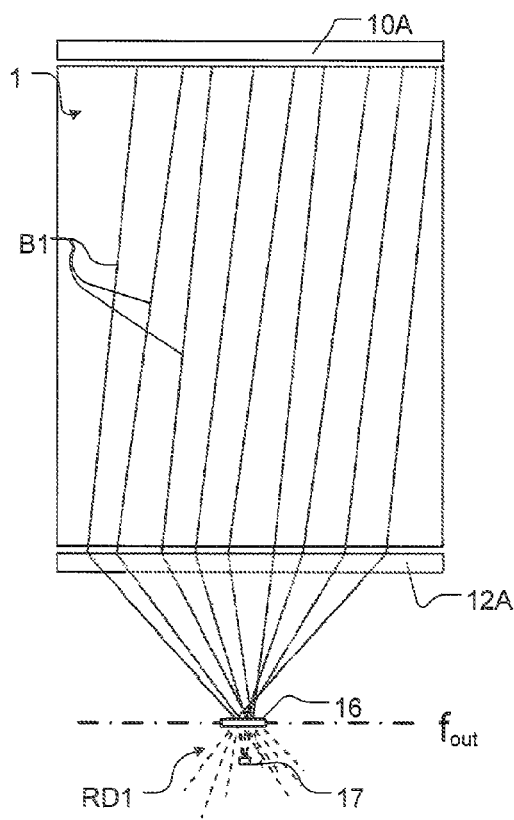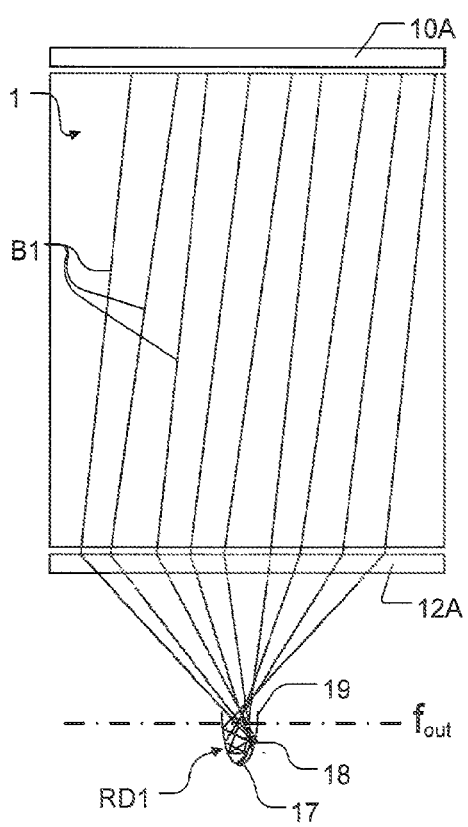
FIG. 5   FIG. 6

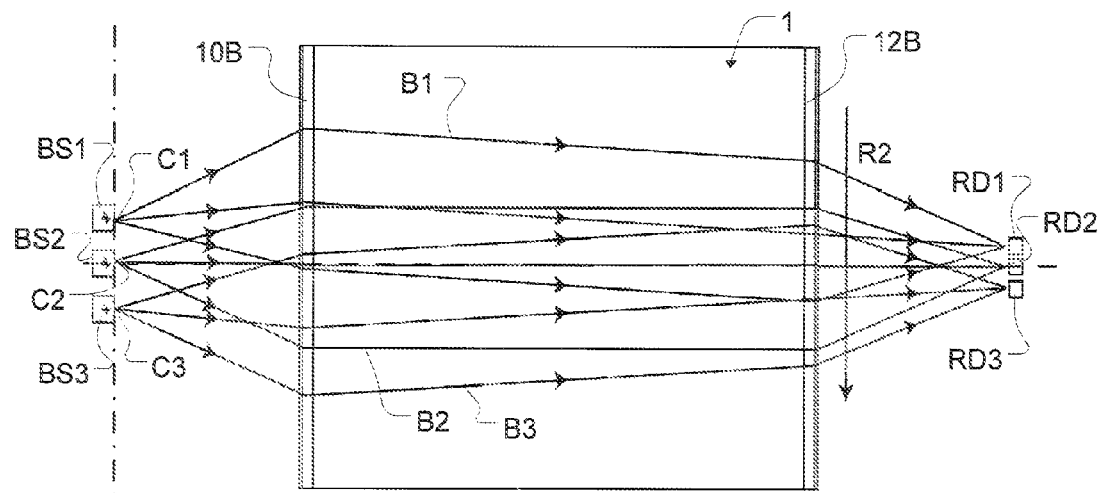
FIG. 17
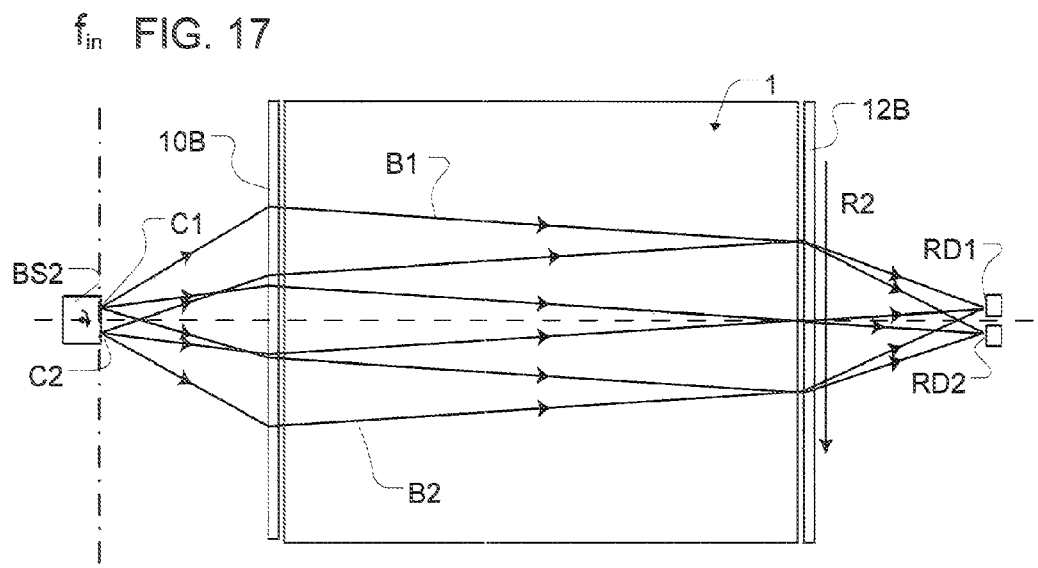
FIG. 18A
FIG. 18B

DETECTING THE LOCATION OF AN OBJECT ON A TOUCH SURFACE

CROSS-REFERENCE TO RELATED APPLICATIONS

The present application claims the benefit of Swedish patent application No. 0801466-4, filed on Jun. 23, 2008, U.S. provisional application No. 61/129,373, filed on Jun. 23, 2008, Swedish patent application No. 0801467-2, filed on Jun. 23, 2008, U.S. provisional application No. 61/129,372, filed on Jun. 23, 2008, Swedish patent application No. 0950245-1, filed on Apr. 15, 2009, and U.S. provisional application No. 61/202,875, filed on Apr. 15, 2009, all of which are incorporated herein by reference.

TECHNICAL FIELD

The present invention relates to techniques for detecting the location of an object on a touch surface. The touch surface may be part of a touch-sensitive panel.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc. into the panel.

US2004/0252091 discloses an alternative technique which is based on frustrated total internal reflection (FTIR). Diverging beams from two spaced-apart light sources is coupled into a panel to propagate inside the panel by total internal reflection. The light from each light source is evenly distributed throughout the entire panel. Arrays of light sensors are located around the perimeter of the panel to detect the light from the light sources. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar technique in which arrays of light beam transmitters are placed along two edges of a panel to set up a grid of intersecting light beams that propagate through the panel by internal reflection. Corresponding arrays of beam detectors are placed at the opposite edges of the panel. When an object touches a surface of the panel, the beams that intersect at the point of touch will be attenuated. The attenuated beams on the arrays of detectors directly identify the location of the object.

These known FTIR techniques suffer from being costly, i.a. since they require the use of a large number of detectors, and possibly a large number of light sources. Furthermore, they are not readily scalable since the required number of detectors/sources increases significantly with the surface area of the panel. Also, the spatial resolution of the panel is dependent on the number of detectors/sources. Still further, the energy consumption for illuminating the panel may be considerable and increases significantly with increasing surface area of the panel.

SUMMARY OF THE INVENTION

It is an object of the invention to at least partly overcome one or more of the above-identified limitations of the prior art.

This and other objects, which will appear from the description below, are at least partly achieved by means of apparatus, methods and a computer program product according to the independent claims, embodiments thereof being defined by the dependent claims.

A first aspect of the invention is an apparatus for determining a location of at least one object on a touch surface, said apparatus comprising: a panel defining the touch surface and an opposite surface; an illumination arrangement adapted to introduce radiation into the panel for propagation by internal reflection between the touch surface and the opposite surface, so as to generate a grid of intersecting radiation paths in a sensing area; a detection arrangement adapted to measure the transmitted energy in said radiation paths; and a data processor connected to the detection arrangement and configured to determine, based on the measured energy, said location based on an attenuation of two or more radiation paths caused by the object touching the touch surface within the sensing area; wherein said illumination arrangement is configured to generate at least a subset of the radiation paths by sweeping at least one beam of radiation along the touch surface; wherein said detection arrangement comprises a fixed re-directing device configured to receive and re-direct said at least one beam onto a common detection point while said at least one beam is swept along the touch surface; and wherein said detection arrangement further comprises a radiation detector which is located at said common detection point to measure the energy of said at least one beam.

In one embodiment, the illumination arrangement is configured to sweep said at least one beam with an essentially invariant main direction within the sensing area.

In one embodiment, the fixed re-directing device comprises an elongate optical element that defines an output focal plane, wherein the illumination arrangement is configured such that the beam, while being swept within the sensing area, is swept along the elongate optical element at an essentially invariant angle of incidence, and wherein the radiation detector is arranged in said output focal plane. In one implementation, the illumination arrangement is adapted to sweep at least two separate beams of radiation within the sensing area, such that each beam is swept along the elongate optical element at a respective angle of incidence, and the detection arrangement comprises at least two radiation detectors, which are arranged at separate locations in said output focal plane to measure the energy of the respective beam.

In one embodiment, the radiation detector comprises a light-sensing surface and device for increasing the effective light-sensing area of the radiation detector, said device being arranged intermediate the re-directing device and the light-sensing surface. In one implementation, the device for increasing the effective light-sensing area is a diffusing element or a concentrator.

In one embodiment, the re-directing device is arranged to extend along an edge portion of said panel.

In one embodiment, the illumination arrangement is configured to inject beams that are collimated at least in the plane of the panel.

In one embodiment, the illumination arrangement and the detection arrangement are configured to introduce and receive said at least one beam on opposite ends of the sensing area.

In one embodiment, the illumination arrangement comprises a beam-scanning device configured to sweep an input beam around an axis of rotation, a fixed beam-directing device configured to receive the thus-swept input beam and generate at least one output beam which is translated in a principal direction while having an essentially invariant main direction, and a coupling element connected to the panel for receiving and injecting said at least one output beam into the panel, thereby forming said at least one beam that is swept along the touch surface within the sensing area. The beam-directing device may comprise an elongate optical element that defines an input focal plane, wherein said axis of scanning is located in said input focal plane. Alternatively or additionally, the beam-scanning device may be configured to sweep at least two separate input beams along the elongate optical element, each input beam being swept around a separate axis of rotation in said input focal plane, thereby causing the elongate optical element to generate output beams with separate main directions. Alternatively or additionally, the beam-directing device may further comprise an elongate grating structure which is arranged to generate said at least one output beam as a set of diffracted beams with a predetermined angular spacing. Alternatively or additionally, the beam-directing device may be arranged to extend along an edge portion of said panel, and the principal direction may be essentially parallel to said edge portion of said panel. Alternatively or additionally, the illumination arrangement may comprise a plate-shaped radiation guide which is arranged underneath the panel, as seen from the touch surface, and a beam-folding system which is arranged to optically connect the radiation guide to the panel, wherein the radiation guide may be configured to guide said at least one output beam by internal reflection from the beam-directing device to the beam-folding system.

In one embodiment, the illumination arrangement is configured to sweep a first set of mutually acute beams in a first principal direction across the panel, wherein the beams in the first set have a maximum mutual acute angle of ≤30°, and preferably ≤20°. The main direction of one of the beams in the first set may be orthogonal to the first principal direction. Alternatively or additionally, each pair of beams in the first set may have a unique mutual acute angle. Alternatively or additionally, the illumination arrangement may be configured to sweep at least one second beam in a second principal direction across the panel. Alternatively or additionally, the illumination arrangement may be configured to sweep a second set of mutually acute beams in a second principal direction across the panel, wherein the beams in the second set have a maximum mutual acute angle of ≤30°, and preferably ≤20°.

The first set may comprise three beams and/or the second set may comprise three beams. Alternatively or additionally, the main direction of one of the beams in the second set may be orthogonal to the second principal direction. Alternatively or additionally, each pair of beams in the second set may have a unique mutual acute angle.

Alternatively or additionally, the first and second principal directions may be mutually orthogonal. Alternatively or additionally, the panel may be rectangular, and the first and second principal directions may be parallel to a respective edge portion of the panel.

A second aspect of the invention is an apparatus for determining a location of at least one object on a touch surface, said touch surface being part of a panel that defines the touch surface and an opposite surface, said apparatus comprising: means for introducing radiation into the panel for propagation by internal reflection between the touch surface and the opposite surface, so as to generate a grid of intersecting radiation paths in a sensing area; means for measuring the transmitted energy in said radiation paths; means for identifying, based on the measured energy, at least two radiation paths that are attenuated by an object touching the touch surface; and means for determining the location of the object based on the attenuated radiation paths; wherein said means for introducing comprises means for sweeping at least one beam of radiation along the touch surface; wherein said means for measuring comprises a fixed means for receiving said at least one beam, while it is swept along the touch surface, and for re-directing said at least one beam onto a common detection point, and means for measuring the energy of said at least one beam at said common detection point.

A third aspect of the invention is a method of determining a location of at least one object on a touch surface, said touch surface being part of a panel that defines the touch surface and an opposite surface, said method comprising the steps of: introducing radiation into the panel for propagation by internal reflection between the touch surface and the opposite surface, so as to generate a grid of intersecting radiation paths in a sensing area; measuring the transmitted energy in said radiation paths; identifying, based on the measured energy, at least two radiation paths that are attenuated by an object touching the touch surface; and determining the location of the object based on the attenuated radiation paths; wherein the step of introducing comprises sweeping at least one beam of radiation along the touch surface; wherein the step of measuring comprises receiving said at least one beam, while it is swept along the touch surface, by a fixed re-directing device which re-directs said at least one beam onto a common detection point, and measuring the energy of said at least one beam at said common detection point.

A fourth aspect of the invention is a method of operating an apparatus for determining a location of at least one object on a touch surface, said touch surface being part of a panel that defines the touch surface and an opposite surface, said method comprising the steps of: operating an illumination arrangement to introduce radiation into the panel for propagation by internal reflection between the touch surface and the opposite surface, so as to generate a grid of intersecting radiation paths in a sensing area; operating a detection arrangement to measure the transmitted energy in said radiation paths; and determining, based on the transmitted energy, said location based on an attenuation of two or more radiation paths caused by the object touching the touch surface within the sensing area; wherein the step of operating the illumination arrangement comprises the step of sweeping at least one beam of radiation along the touch surface, such that said at least one beam, after passing the sensing area, is received by a fixed re-directing device which re-directs said at least one beam onto a common detection point; and wherein the step of operating the detection arrangement comprises measuring the energy of said at least one beam by a radiation detector which is located at the common detection point.

A fifth aspect of the invention is a computer program product comprising computer code which, when executed on a data-processing system, is adapted to carry out the method of the fourth aspect.

Any one of the embodiments of the first aspect can be combined with the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 2A and 2B are top plan views of a touch-sensing system to illustrate operating principles of a detection arrangement.

FIGS. 3A-3C contain plan views (right) to illustrate re-direction of the main directions of two beams a focal plane, and graphs of corresponding spatial energy distributions (left) in the focal plane.

FIGS. 4A-4B are plan views of detection arrangements with optical fibers.

FIGS. 5 and 6 are plan views of touch-sensing systems with alternative detection arrangements.

FIG. 17 illustrates a variant of the illumination arrangement in FIG. 16.

FIG. 18A illustrates a further variant of the illumination arrangement in FIG. 16, and FIG. 18B is illustrates an example of beam scanner for generating multiple angular scanning beams.

DETAILED DESCRIPTION OF EXAMPLE EMBODIMENTS

Figure 1A:
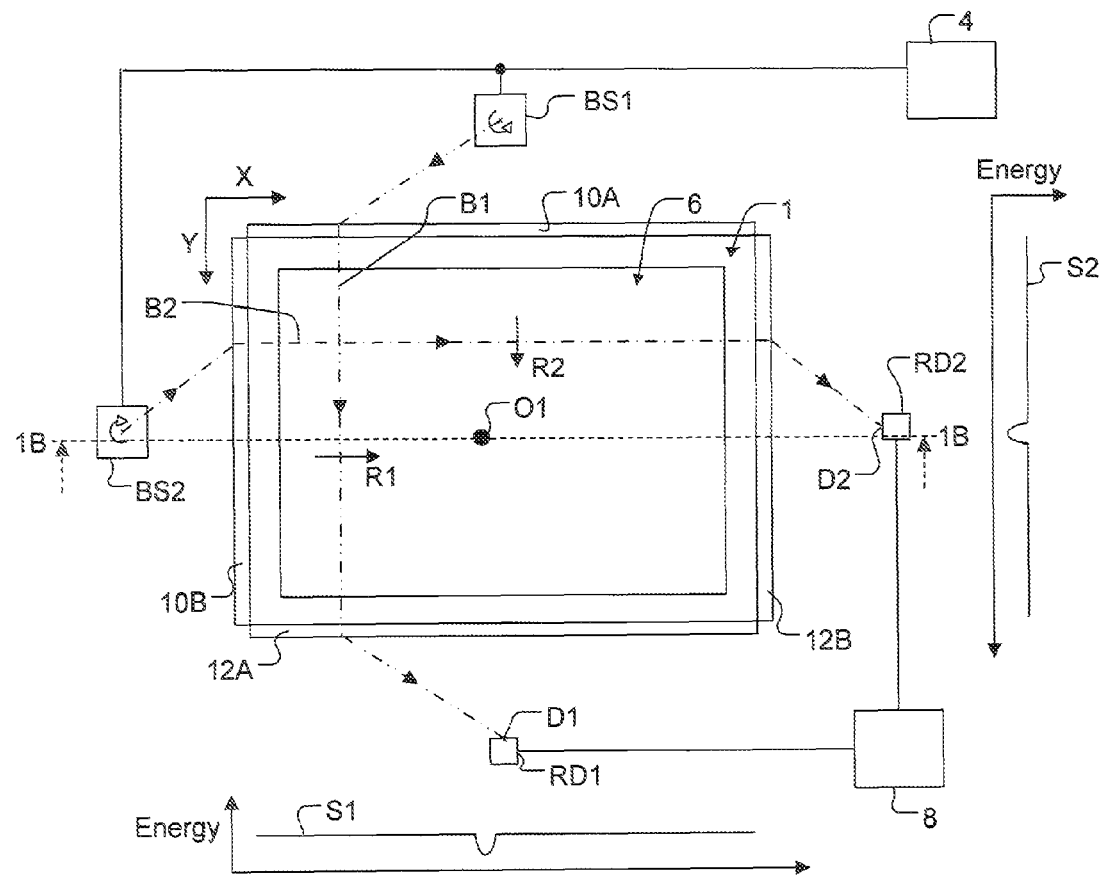
FIG. 1A is a top plan view of an embodiment of a touch-sensing system, and includes graphs of measurement signals generated in the system.

The following description starts by describing an embodiment of an overall touch-sensing system according to the present invention, followed by different embodiments of a detection arrangement for such a system. Thereafter, exemplifying implementation details relevant to the overall system are given, and aspects of multi-touch detection are discussed. Subsequently, different beam sweeps and mutual arrangements of beams during these sweeps are discussed in detail, and a description is given of different embodiments of an illumination arrangement for generating the beam sweeps. Finally, an exemplifying algorithm for determining touch locations in the system is given. Throughout the description, the same reference numerals are used to identify corresponding elements.

The present invention relates to a technique for determining the location of an object that touches a surface of a radiation transmissive panel. An example of a touch-sensing system including such a panel 1 is shown in the top plan view of FIG. 1A and the section view of FIG. 1B (taken along line 1B-1B in FIG. 1A). The panel 1 defines two opposite and generally parallel surfaces 2, 3 and may be planar or curved. The panel 1 is configured to allow radiation to propagate, by internal reflection, in a radiation propagation channel formed between two boundary surfaces of the panel, wherein at least one of the boundary surfaces (denoted "touch surface") allows the propagating radiation to interact with a touching object O1. In this interaction, part of the radiation may be scattered by the object O1, part of the radiation may be absorbed by the object O1, and part of the radiation may continue to propagate unaffected. Thus, when the object O1 touches a surface of the panel 1 (e.g. the top surface 2), the energy of the transmitted radiation is decreased. By measuring the energy of the radiation transmitted through the panel 1 from a plurality of different directions, the location of the touching object ("touch location") may be detected, e.g. by triangulation.

Figure 1B:
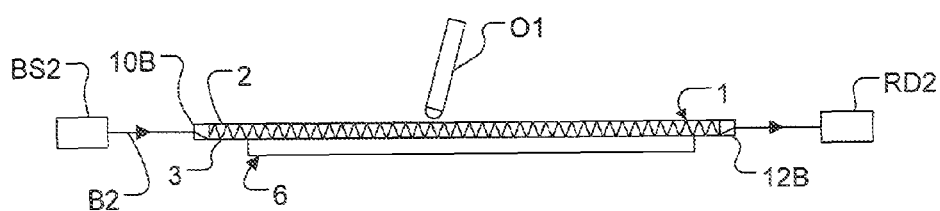
FIG. 1B is a section view of the system in FIG. 1A.

As shown in FIG. 1A, radiation is introduced into the panel 1 in the form of a number of non-parallel beams B1, B2. Each beam B1, B2 is swept or scanned across a touch-sensing area of the panel by a beam scanner BS1, BS2, for example under control of a control unit 4. The touch-sensing area ("sensing area") is defined as the surface area of the panel that is swept by at least two beams. As will be further explained in the following, the location of an object O1 that touches the panel 1 (i.e. the touch location) can be determined if the object O1 affects at least two non-parallel beams B1, B2 while these are swept across the panel. Each beam B1, B2 is preferably narrow in its sweep direction R1, R2 and wide perpendicularly thereto, i.e. in the depth direction of the panel. Preferably, each beam B1, B2 is essentially collimated in the sweep direction, i.e. in the plane of the panel, and may or may not be collimated in the depth direction (i.e. transverse to the plane of the panel. After passing the sensing area, the beams B1, B2 are out-coupled from the panel 1 and directed onto a respective radiation detector RD1, RD2 for measuring the beam energy during the beam sweep.

In the example of FIG. 1, the system operates by causing the beam scanners BS1, BS2 to sweep one beam B1 horizontally (X direction) across the panel 1 and another beam B2 vertically (Y direction) across the panel 1. The bottom portion and right-hand portion of FIG. 1A contain graphs that illustrate measurement signals S1, S2 that represent the energy of beams B1, B2 as measured by the respective detector RD1, RD2 during a sweep. The signals may indicate measured energy as a function of time, sweep angle or X/Y position in a given coordinate system with respect to the panel 1. As shown, the touching object O1 results in a local decrease in measured beam energy for each sweep. The detectors RD1, RD2 are connected to a data processor 8, e.g. a computer, which obtains the measurement signals S1, S2 from the detectors RD1, RD2 and calculates the location of the object O1 based on the thus-obtained signals, e.g. by reconstructing the radiation paths that correspond to the local decrease in the signals and by identifying the intersection of these radiation paths.

Generally, the data processor 8 is configured to determine the position of one or more objects touching the panel based on the output signals of the detectors for each sensing instance. A sensing instance is formed when all beams have been swept once across the sensing area. The temporal resolution of the system is determined by the update frequency, which is the frequency of sensing instances. For example, for a system designed for recording of handwriting, it may be desirable to have an update frequency of at least 75 Hz, whereas other applications may require a lower or higher temporal resolution.

It should be realized that the control unit 4 and the data processor 8 may be implemented on one and the same device, or on physically separate devices. Furthermore, the data processor 8 may, but need not, be connected to the control unit 4 for synchronizing the read-out of the measurement signals and the touch determination process with the operational control of the illumination arrangement.

In all embodiments, the beams may be swept sequentially across the sensing area within a sensing instance. Alternatively, two or more beams may be swept wholly or partly simultaneously across the sensing area during a sensing instance. Preferably, each beam is swept in a continuous movement across the sensing area.

On a general level, the system in FIG. 1 includes an illumination arrangement for introducing radiation into the panel for propagation by internal reflection between the touch surface and the opposite surface, so as to generate a grid of intersecting radiation paths in a sensing area. Further, on a general level, the system includes a detection arrangement for measuring the transmitted energy in the radiation paths, as well as a data processor for determining, based on the measured energy, the location of the object based on the attenuation of two or more radiation paths caused by the object touching the touch surface within the sensing area.

In the example of FIG. 1, the illumination arrangement is configured to generate the radiation paths inside the panel by sweeping beams B1, B2 of radiation along the touch surface 2. The spatial direction and location of the beam in the sensing area during the sweep is determined by a fixed beam-directing device 10A, 10B which is arranged to receive the beam B1, B2 from the beam scanner BS1, BS2 and to output a re-directed beam. The design of the beam-directing device 10A, 10B will be discussed in more detail further below.

In the example of FIG. 1, the detection arrangement comprises two fixed re-directing devices 12A, 12B, each being configured to receive and re-direct one of the beams B1, B2 onto a common detection point D1, D2 while the beam is swept along the touch surface. A stationary radiation detector RD1, RD2 is located at, i.e. in or near, the common detection point D1, D2 to measure the energy of the beam during the sweep.

By using a combination of a beam scanner BS1, BS2 and a radiation detector RD1, RD2, only a small number of radiation sources and detectors are required to detect the location of the object O1 on the touch surface 2. Furthermore, the number of sources/detectors is not dependent on the surface area of the panel 1, and thus the touch-sensing system is readily scalable.

Compared to prior art techniques with constant illumination of the entire panel, the use of beam scanners BS1, BS2 allows for a lower power consumption for a given signal-to-noise ratio since only a small part of the panel 1 is illuminated at a time.

Furthermore, the spatial resolution of the touch-sensing system is given by the sampling rate, i.e. the rate at which measurement data is sampled from each detector RD1, RD2. This means that any desired resolution could be achieved provided that sufficient amount of radiation is introduced into the panel 1. Furthermore, the spatial resolution can be varied during operation of the touch-sensing system, and different spatial resolution can be achieved in different parts of the sensing area.

By using a combination of a fixed re-directing device 12A, 12B, which defines a common detection point D1, D2 for one of the swept beams B1, B2, and a radiation detector RD1, RD2, which is located in or near the common detection point D1, D2, the transmitted energy of each beam B1, B2 can be measured with a minimum of components and without requiring any movable parts in the detection arrangement.

Although not shown in FIG. 1, the beams B1, B2 are generally translated across the sensing area with an essentially invariant main direction during the sweep. This may give the advantage of yielding a uniform spatial resolution within the entire sensing area, provided that the sampling rate is constant during the sweep. It may also facilitate the design of the re-directing device 12A, 12B, as will be further explained below.

Detection Arrangement

The structure and operation of the detection arrangement in general, and the re-directing devices 12A, 12B in particular, will now be further explained and exemplified in relation to FIGS. 2-6.

Generally, the re-directing device 12A, 12B is an element or assembly of elements which defines an elongate front side facing the sensing area. As the beam B1, B2 is swept within the sensing area, the beam B1, B2 is also swept along at least part of the front side of the re-directing device 12A, 12B. To limit the footprint of the touch-sensing system, the re-directing device 12A, 12B may be placed near a periphery portion of the panel 1. For reasons of robustness and mounting precision, the re-directing device 12A, 12B may be mounted in contact with such a periphery portion.

In one embodiment, the re-directing device 12A, 12B is an optical device that defines a focal plane parallel to and at a distance from the front side of the optical device. Thus, all rays that impinge on the front side at one and the same angle of incidence are directed to a common point in the focal plane. Rays with different angles of incidence are directed to different points in the focal plane, and rays that are normal to the front side will be directed to the focal point of the optical device, i.e. the intersection between the focal plane and the optical axis of the optical device.

Thus, it should be realized that by sweeping a beam with an essentially invariant main direction along such an optical device, the beam is re-directed onto a common detection point during the sweep. Further, the optical device may or may not be configured to converge the incoming radiation also in the depth direction (i.e. transverse to the touch surface).

FIG. 2A illustrates an embodiment in which the optical re-directing device 12B is a lens device that transmits and redirects the incoming radiation. The lens device may be made up of diffractive optical elements (DOE), micro-optical elements, refractive lenses and any combination thereof. In one presently preferred embodiment, the lens device is a Fresnel lens. FIG. 2A shows three rays with equal angle of incidence that are directed onto one point in the focal plane $f_{out}$, and one ray with a different angle of incidence that is directed elsewhere in the focal plane.

From the above, it is to be understood that the lens device 12B also operates as an angular filter with respect to a detector arranged in the detection point, since only radiation that impinges on the front side of the lens device 12B within a confined range of angles will be directed onto the detector. The range of angles defines the effective view angle of the detector and is given by the design of the lens device 12B (in particular its focal length which defines the relation between a difference in angle of incidence and the spacing between corresponding detection points in the focal plane) as well as the size of the light-sensing surface of detector.

Thus, the lens device 12B will limit the effective view angle of the detector, and thereby limit the amount of undesired background radiation that reaches the detector. For example, ambient radiation or radiation scattered within the panel will only reach the detector to a limited extent. For example, as will be discussed further below, irregularities in the panel may cause the beam to be scattered while it propagates through the panel, causing the beam to be broadened in the plane of the panel as a function of distance from the injection site. A small view angle of the detector will limit the detection to a confined region around the main direction of the beam, thereby increasing the precision in locating the energy decrease caused by the touching object.

The lens device 12B makes it possible to separately detect the energy of more than one beam downstream the sensing area. As will be discussed below, it may be desirable to sweep two or more non-parallel beams in the same direction across the touch surface. Such beams with different main directions will be re-directed onto different detection points by the lens device 12B. FIG. 2B illustrates such an embodiment in which two beams B1, B2 are swept along the lens device 12B. Each beam sweep results in a set of radiation paths that are directed onto a respective radiation detector RD1, RD2. Thus, the energy of the beams can be measured separately, even if the beams B1, B2 are swept across the lens device 12B at the same time.

In an alternative embodiment, shown in FIGS. 3B-3C, one detector RD1 is arranged in the focal plane to measure the energy of more than one beam B1, B2. In such an embodiment, if the effective view angle of the detector RD1 is large enough, the desired set of beams B1, B2 may be directed onto one and the same light-sensing surface of the detector RD1. If the energy of two or more beams B1, B2 is to be measured by one detector RD1, the beams B1, B2 are suitably swept sequentially across the touch surface, such that they impinge on the lens device 12B one at a time.

The placement of the detectors RD1, RD2 in the focal plane $f_{out}$ should account for the fact that beams B1, B2 generally have an extended beam profile when they hit the lens device 12B, and that the lens device 12B thus redirects the beams to a detection area rather than a detection point in the focal plane $f_{out}$. This phenomenon is further illustrated in FIG. 3. The right-hand portion of FIG. 3A shows how the main directions of two beams B1, B2 are re-directed onto a respective detection point in the focal plane $f_{out}$. The left-hand portion of FIG. 3A illustrates the energy distribution of the beams B1, B2 in the focal plane, with arrows indicating the width and placement of the detectors. As shown, with sufficient separation between the detectors RD1, RD2, it is possible to measure the energy of each beam B1, B2 separately. It is to be noted that the beam energy can be measured even if the detectors RD1, RD2 are not be placed at center of each beam profile, i.e. at the detection point for the main direction. Further it is to be understood that the light-sensing surface area of the detectors RD1, RD2 can be optimized to maximize the amount of the total energy measured while minimizing cross-talk between the beams B1, B2. FIG. 3B corresponds to FIG. 3A, but illustrates the use of a single detector RD1 to measure the energy of both beams B1, B2. Here, one relatively small detector is arranged between the detection points for the main directions. Due to the beam profile, the detector RD1 is capable of measuring the energy of both beams B1, B2, albeit only a fraction of the total beam energy. FIG. 3C corresponds to FIG. 3A, but illustrates the use of a larger detector RD1 to measure the energy of both beams B1, B2. This embodiment will increase the detected fraction of the beam energy, but the increased surface area of the detector RD1 may also result in increased detection of noise.

It is to be understood that the lens device 12B can be arranged to re-direct the beams B1, B2 even if the main direction of the beam varies during the sweep. For example, variations in the main direction of a beam may be caused by inaccuracies in the illumination arrangement, e.g. in the beam scanner (BS1, BS2 in FIG. 1) or the beam-directing element (10A, 10B in FIG. 1A). Generally, unintentional angle variations do not exceed ±2°. Suitably, the detection arrangement is designed with a view angle of the detector that exceeds the expected variations.

In a variant, the illumination arrangement may be designed to intentionally vary the main direction of one or more beams B1, B2 during the sweep, e.g. to provide certain touch-sensing properties in certain parts of the sensing area. As long as the intended variations of the main direction along the lens device 12B is known, it is possible to design the lens device to 12B re-direct the main direction of the beam onto a common detection point. However, the design of the lens device 12B is simplified if the main direction is essentially invariant during the sweep, in particular if two or more beams B1, B2 are to be re-directed by one and the same lens device 12B.

In an alternative embodiment, the optical re-directing device 12A, 12B is a minor device that redirects the incoming radiation by reflection. The minor device may be made up of diffractive optical elements (DOE), micro-optical elements, mirrors and any combination thereof. An example of such a minor device is shown in FIG. 19C-19D. The above discussion with respect to the lens device is equally applicable to such a mirror device.

In another alternative embodiment, shown in FIG. 4A, the re-directing device 12B comprises a bundle of optical fibers 14 that provide optical channels between areas at the edge of the panel and the radiation detector RD2. The angle selectivity of the detection arrangement can be controlled by the numerical aperture (NA) of the receiving ends of the fibers 14, i.e. the fiber end facing the panel 1. For example, to limit the effective view angle of the detector RD2, the receiving ends may be designed with a small NA and be arranged perpendicularly to the main direction of the beam B2. The re-directing device 12B of FIG. 4A can also be designed to direct more than one beam onto the detector RD1, provided that the NA is large enough and the beams are swept sequentially across the panel 1. FIG. 4B illustrates a variant in which three separate bundles of optical fibers are arranged to re-direct three beams B1-B3 with different scan angles to a respective detector RD1-RD3. For example, the receiving ends of the fibers in the different bundles may have a small NA and be arranged perpendicularly to the main direction of the respective beam B1-B3.

In all of the above embodiments, the energy of the beams may be measured by any type of radiation detector capable of converting radiation into an electrical signal. In certain embodiments, the detector may be a photo-detector with only one radiation-sensitive element, which may have a large detection surface, resulting in low detection noise. Furthermore, photo-detectors are presently cheap in comparison with other detectors. In another variant, a detector is formed by appropriate binning of plural radiation-sensitive elements (pixels) of a one- or two-dimensional detector such as a CMOS or CCD sensor. For example, in embodiments with plural detectors in the focal plane, each detector may be formed by one or more pixels of such a one- or two-dimensional sensor which is arranged in and parallel to the focal plane of the re-directing device.

In the foregoing, it has been assumed that the main direction of each beam is re-directed onto a single, very small detection point during a beam sweep. However, in a commercial implementation, tolerances in the optical components (e.g. in the beam scanner BS1, BS2 or the beam-directing device 10A, 10B) may cause the main direction of a beam to vary during a sweep. For practical reasons, the re-directing device 12A, 12B may be designed by assuming that the main direction is invariant during the sweep. Such a mismatch between design and reality causes the main direction of the beam to be re-directed onto an extended detection area around a nominal detection point in the focal plane. This means that the location of the beam profile in the focal plane (see FIG. 3) will vary during a beam sweep. It is realized that the measured energy is then dependent on the placement of the detector in relation to the nominal detection point, the size of the light-sensing surface of the detector, the width of the beam profile, and the variations in beam profile location during a sweep. To suppress noise, it may be desirable to use a detector with a small light-sensing surface. However, with a small light-sensing surface, variations in beam profile location may result in significant variations in measured beam energy. Although it is possible to compensate for such variations, the measured energy may be too low to allow for a sensible position determination.

In FIG. 5, this problem is ameliorated by providing the detector RD1 with a stationary diffusing element or plate 16, which is arranged between the re-directing device 12A and the light-sensing surface 17 of the detector RD1, preferably in the focal plane $f_{out}$ of the device 12A. FIG. 5 illustrates the main direction of the beam B1 at different time points during the sweep. As indicated, variations in the main direction cause the beam B1 to be directed to different points during the sweep. The diffusing element 16 will transmit and scatter the incoming radiation over a large solid angle (indicated by dashed lines). Thereby, a fraction of the incoming radiation will be detected by the light-sensing surface 17 even though the light-sensing surface 17 is smaller than the detection area on the diffusing element 16.

FIG. 6 is a plan view of an alternative solution, in which the detector is provided with a stationary concentrator 18 (shown in cross-section). The concentrator 18 is placed between the re-directing device 12A and the light-sensing surface 17 of the detector RD1. Like in FIG. 5, the main direction of the beam B1 is illustrated at different time points during the sweep, and variations in the main direction cause the beam B1 to be directed to different points in the focal plane $f_{out}$ during the sweep. In the example of FIG. 6, the concentrator 18 comprises an internally reflecting cylindrical shell 19 which surrounds and is aligned with the light-sensing surface 17. The shell 19 defines an opening that is arranged to receive the re-directed beam B1, which is then directed, by one or more reflections inside the shell 19, onto the light-sensing surface 17. Similarly to the diffusing element 16 in FIG. 5, the concentrator 18 increases the effective light-sensing area of the detector RD1. However, the concentrator 18 allows a larger fraction of the incoming light to be detected. In one implementation, the shell 19 is made of plastic and has an internal layer of reflective material. In one specific implementation, the concentrator 18 is configured as a compound parabolic concentrator (CPC). In yet another variant (not shown), the concentrator 18 in FIG. 6 is implemented by a wide-angle lens.

Exemplifying Implementation Details

Typically, the panel is made of solid material, in one or more layers. The radiation propagates by internal reflections between the touch surface and the opposite boundary surface. The reflections in the touch surface are caused by total internal reflection (TIR), resulting from a difference in refractive index between the material of the panel and the surrounding medium, typically air. The reflections in the opposite boundary surface may be caused either by TIR or by a reflective coating applied to the opposite boundary surface. The total internal reflection is sustained as long as the radiation is injected into the panel at an angle to the normal of the touch surface which is larger than the critical angle at the injection site of the panel. The critical angle is governed by the refractive indices of the material receiving the radiation at the injection site and the surrounding material, as is well-known to the skilled person. The above-mentioned process of interaction between the touching object and the propagating radiation may involve so-called frustrated total internal reflection (FTIR), in which energy is dissipated into the object from an evanescent wave formed by the propagating radiation, provided that the object has a higher refractive index than the material surrounding the panel surface material and is placed within less than several wavelengths distance from the touch surface. Generally, the panel may be made of any material that transmits a sufficient amount of radiation in the relevant wavelength range to permit a sensible measurement of transmitted energy. Such material includes glass, poly(methyl methacrylate) (PMMA) and polycarbonates (PC).

The panel may be of any shape, such as circular, elliptical or polygonal, including rectangular. The panel is defined by a circumferential edge portion, which may or may not be perpendicular to the top and bottom surfaces of the panel. The radiation may be coupled into and out of the panel directly via the edge portion. Alternatively, a separate coupling element may be attached to the edge portion or to the top or bottom surface of the panel to lead the radiation into or out of the panel. Such a coupling element may have the shape of a wedge (cf. FIGS. 20-21 below).

As indicated in FIG. 1, the touch-sensing system may also include an interface device 6 that provides a graphical user interface (GUI) within at least part of the sensing area. The interface device may be in the form of a substrate with a fixed image that is arranged over, under or within the panel. Alternatively, the interface device may be a screen arranged underneath or inside the system, or a projector arranged underneath or above the system to project an image onto the panel. Such an interface device may provide a dynamic GUI, similar to the GUI provided by a computer screen.

Although not shown in the drawings, an anti-glare surface/layer may be provided on one or both of the panel surfaces. The use of an anti-glare surface/layer may be advantageous to reduce glares from external lighting on the surface of the panel. Such glares might otherwise impair the ability of an external observer to view any information provided on the panel by the aforesaid interface device. Furthermore, when the touching object is a naked finger, the contact between the finger and the panel normally leaves a fingerprint on the surface. On a perfectly flat surface, such fingerprints are clearly visible and usually unwanted. By adding an anti-glare surface/layer to the surface, the visibility of fingerprints is reduced. Furthermore, the friction between finger and panel decreases when an anti-glare is used, thereby improving the user experience. Anti-glares are specified in gloss units (GU), where lower GU values result in less glares. In one embodiment, the touch surface(s) of the panel has a GU value of 10-200, preferably 100-120.

Multi-Touch Detection

Figure 7:
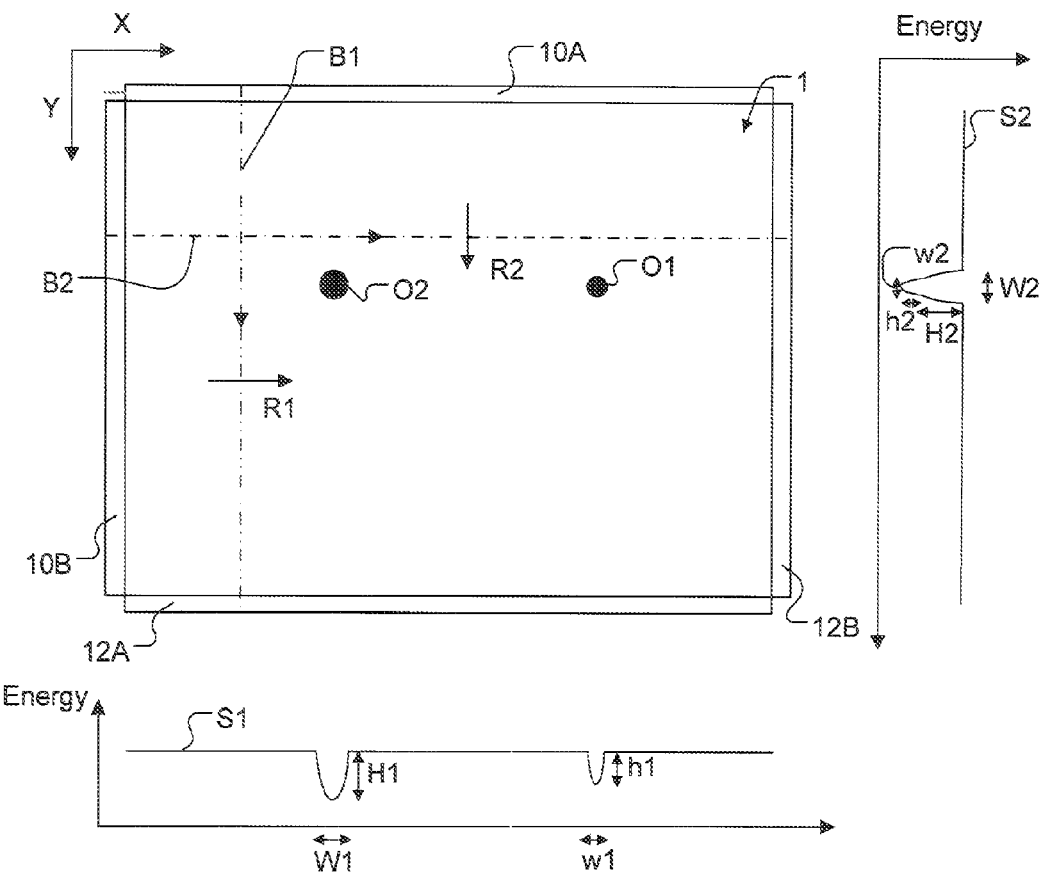
FIG. 7 is a top plan view of the system of FIG. 1A with two touching objects, and the corresponding measurement signals.

The touch-sensing system according to embodiments of the invention may be operated to determine the location of a plurality of objects touching the surface during a sensing instance. As mentioned above, only part of the radiation is absorbed/scattered by an object, while the remaining radiation continues to propagate along the main direction of the beam. Thus, if two objects happen to be placed after each other in the main direction of a beam, part of the beam will interact with both objects. Provided that the beam energy is sufficient, a remainder of the beam will reach the scanning detector and generate a measurement signal that allows both interactions to be identified. FIG. 7 shows the system of FIG. 1A where two objects O1, O2 are placed simultaneously (i.e. during one and the same sensing instance) within the sensing area of the panel 1, and the resulting measurement signals S1, S2. Object O1 is attributed to signal features w1 and h1 in signal S1 and signal features w2 and h2 in signal S2, whereas object O2 is attributed to signal features W1 and H1 in signal S1 and signal features W2 and H2 in signal S2. Signal features w1, w2, W1, W2 (width features) depend on the apparent size of the objects O1, O2. Signal features h1, h2, H1, H2 (energy features) depend on the absorptive/scattering properties of the objects O1, O2 as well as the size of the objects. Provided that the signals S1, S2 allow the data processor 8 (FIG. 1) to distinguish between the objects, their location in the sensing area can be determined.

In a system with negligible scattering, the ratio of energy absorbed by an object O1, O2 is independent of its distance to the detector. This means that a transmission signal detected on a detector will be independent of the distance between beam scanner, object and scanning detector, with the transmission signal being defined as a measurement signal with object divided by a background signal, e.g. a measurement signal without object. The transmission signal of two objects O1, O2 on the same detection line (cf. beam B2 in FIG. 7) is equal to the product of an individual transmission signal with only one object O1 and an individual transmission signal with only the other object O2. If there are more than two objects on the same detection line, the total transmission signal is the product of all individual transmission signals: $T=\Pi T_i$. This is true for any number of objects on any detection line, provided that a remainder of the beam reaches the detector.

The position determination may be simplified by operating on logarithms, since the logarithm of the total transmission signal is then equal to the sum of the logarithms of the individual transmission signals: $\log T = \Sigma \log T_i$. However, logarithms need not be used.

Figure 8:
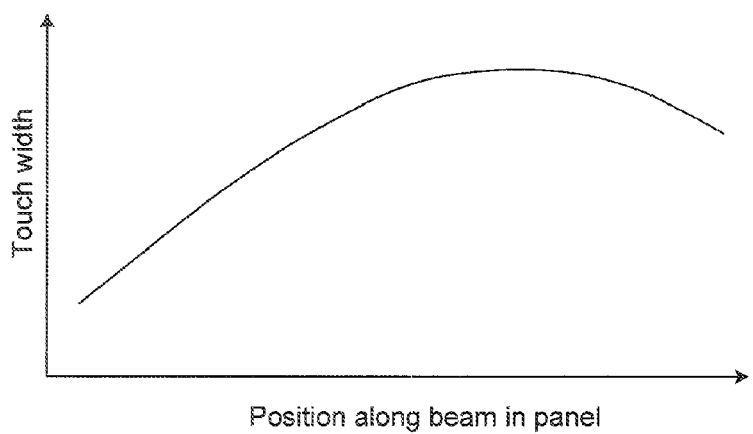
FIG. 8 is a graph of signal width as a function of touch location along a beam in a panel with a scattering surface.

If scattering is present in the system, the transmission signal of an object O1, O2 will depend on the location of the object along the main direction of a beam. Scattering is primarily caused by the beam being scattered each time it is reflected internally against one or both of the boundary surfaces. This causes the beam to be broadened in the plane of the panel as the beam travels from the injection site through the panel. Thus, for each internal reflection with scattering, some radiation is diverted away from the main direction of the beam, and the centre of the beam looses energy with distance. Another effect is that scattered radiation from the broadened beam re-enters the beam behind a touching object. This effect is dependent on the distance between the object and the detector. The combined effects of broadening and re-entry generate a functional dependence between the signal width (cf. w1 and W1 in FIG. 7) in the measurement signal and the distance between the detector and the touching object. FIG. 8 illustrates an example of such a functional dependence, i.e. the measured signal width as a function of position along the beam for an object with a given size (width). Clearly, the measurement signals (e.g. S1, S2) will contain additional distance information, via the functional dependence. If the functional dependence is known or approximated, the additional distance information in the measurement signals may be utilized to facilitate and/or improve the position determination. The use of the functional dependence is further described in U.S. provisional application No. 61/202,208, which was filed on Feb. 5, 2009 and which is incorporated herein by reference.

Scattering is particularly noticeable if an anti-glare surface/layer is provided on one or both of the panel surfaces. The anti-glare surface/layer provides a diffusing structure which may enhance the scattering of the beam for each internal reflection, and which may also cause radiation to escape through the surface for each internal reflection. Thus, the provision of an anti-glare surface/layer generally increases the broadening of the beam with distance from the injection site. This will cause the above-mentioned transmission signal to depend on the distance between emitter and object as discussed above and indicated in FIG. 8.

Exemplifying Beam Arrangements

In the following, different arrangements of the beams within the sensing area will be discussed with reference to FIGS. 9-14. Since these figures focus on the beam arrangement with respect to the panel, most hardware components have been omitted. It is to be understood that the illustrated systems can be implemented by the same or a similar combination of components as described above with reference to FIGS. 1-7.

As will be further explained below, different beam arrangements within the panel may provide different characteristics to the touch-sensing system, e.g. with respect to the precision in detecting touch locations, the number of touch locations that can be detected within a sensing instance, the technical complexity of the system, the footprint of the system, the relative size of the multi-touch sensing area to the total surface area of the panel, etc.

In the illustrated beam arrangements, it is to be understood that the beams do not physically intersect over the entire panel. Instead, radiation paths and points of intersection between the radiation paths can be reconstructed when each of the beams has been swept across the panel.

Furthermore, it is to be understood that the following discussion about beam directions refers to the main direction of each beam, which is a straight symmetry line that extends in the panel from the beam injection site, as seen in a plan view of the panel.

Still further, in the context of the present application, a "sweep direction" refers to a principal direction that includes a certain direction (R) and its opposite direction (-R).

In the Figures, a Cartesian coordinate system has been introduced, with the coordinate axes X,Y being parallel to the sides of the rectangular panel. This is only for the purpose of illustration, and the touch locations can be represented in any type of coordinate system, e.g. polar, elliptic, parabolic, etc.

Figure 9:
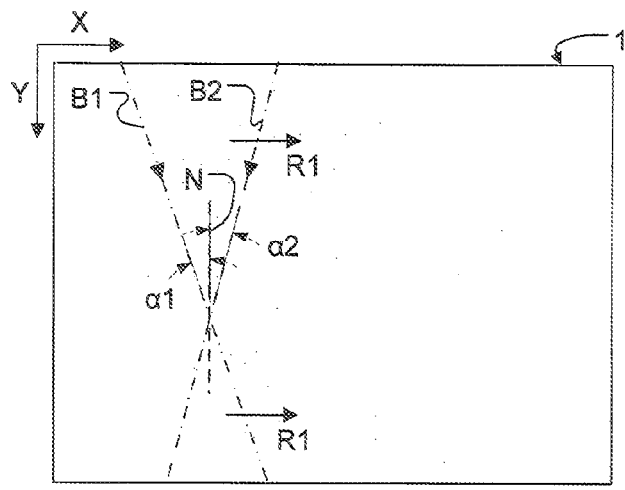
FIG. 9 is a top plan view of another embodiment.

In one beam arrangement, one or more of the beams is non-perpendicular to its sweep direction. Furthermore, the sweep direction may be the same for both beams. FIG. 9 illustrates an example of such a beam arrangement in which two non-parallel beams B1, B2 are translated in the same sweep direction R1 across a sensing area, the main direction of each beam defining a respective angle $\alpha 1$, $\alpha 2$ to the normal N of the sweep direction. This type of beam arrangement with two non-parallel beams B1, B2 that are swept in one and the same direction R1 across a sensing area is denoted "v-scan" in the following. In the illustrated embodiment, as well as in all other embodiments, the beams B1, B2 may be introduced from opposite sides of the sensing area or on the same side. In the illustrated v-scan embodiment, the sensing area (indicated by hatched lines) is a subset of the surface area of the panel 1.

Figure 10A:
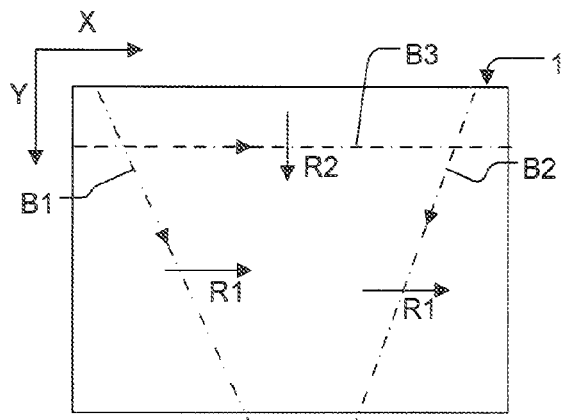
FIGS. 10A-10C are top plan views of yet another embodiment, with FIG. 10A illustrating beam sweeps, FIG. 10B illustrating the location of different sensing portions, and FIG. 10C illustrating the mutual beam angle between the beams.
Figure 10B:
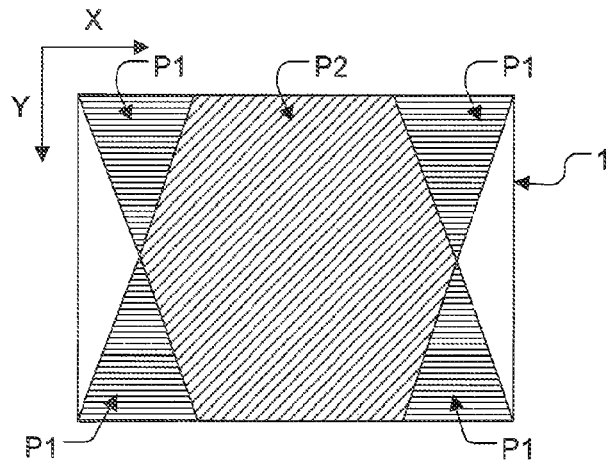
Figure 10C:
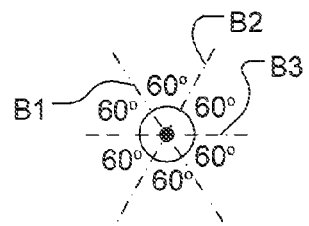

The ability of the touch-sensing system to detect the location of a plurality of objects touching the sensing area within a sensing instance is improved by sweeping more than two beams across the sensing area. Example embodiments that enable this so-called "multi-touch" functionality will now be described with reference to FIGS. 10-14. FIG. 10A-10C illustrates an embodiment in which three beams B1-B3 are swept across the sensing area. FIG. 10A shows that two non-parallel beams B1, B2 are translated in a first sweep direction R1, and a third beam B3 being swept in a second sweep direction R2 which is perpendicular to the first sweep direction.

In the illustrated example, the first and second sweep directions R1, R2 are parallel to the sides of the panel. This has been found to facilitate the design of the system. For example, as described in the foregoing, an elongate beam-directing element (e.g. 10A, 10B in FIG. 1) may be arranged along the side of the panel to define the main beam direction in the panel as a beam is swept along the beam-directing element. Thus, for a panel that is defined by linear periphery portions (sides/edges), it may generally be desirable for each sweep direction to be essentially parallel to a respective periphery portion.

In FIG. 10A, the beams B1-B3 form a v-scan in the X direction and a single scan in the Y direction. In the illustrated example, the beams B1, B2 have equal but opposite angles to the normal of the sweep direction. The beam swept in the Y direction is orthogonal to its sweep direction. Thereby, as shown in FIG. 10B, the sensing area of the panel comprises a number of first sub-portions P1, in which each point of intersection is formed by two beams, and a central second sub-portion P2, in which each point of intersection is formed by three beams. In one specific embodiment, the beams B1-B3 are essentially equiangular within the second sub-portion P2.

Such a beam arrangement maximizes the mutual angle between the beams. A large mutual angle may improve the precision of the detected touch locations, at least in some implementations. By "equiangular beams" is meant that, in each point of intersection, the main directions of the beams are equally distributed over 360°. In this example, as shown in FIG. 10C, the beams intersect with a mutual angle of 60° ($\alpha 1 = \alpha 2 = 30°$).

Although it may be desirable for the beams to be equiangular within the sensing area, such a beam arrangement may restrict the sensing area to the central portion of the panel (cf. sub-portion P2), whereas the remainder of the total panel surface is wasted. Thus, the footprint of the touch-sensing system may become excessive in relation to the size of the sensing area.

However, as indicated above, there are sub-portions (cf. sub-portion P1) outside the central portion that are swept by two beams, albeit not in an equiangular configuration. These sub-portions may also offer touch-sensitivity. However, the performance may differ between the central portion and these sub-portions, e.g. with respect to the precision that can be attained in the determination of the location of each object, as well as the number of simultaneous touches that can be discriminated. The overall performance of the system may be improved by increasing the number of beams that are swept across the panel, but increasing the number of beams will also increase the number of sub-portions that are swept by a different number of beams. Thus, differences in performance may prevail across the panel. Furthermore, it may be desirable to avoid sweeping more than about 6-10 beams across the panel. As the number of beams increases, so does the cost, the technical complexity and possibly the footprint of the system. Furthermore, since the sampling rate of the processing system is normally constant at a certain price point, increasing the number of beams will decrease the number of samples per beam sweep. It is also possible that the measured signal level for each sample decreases with an increased number of beams.

Figure 11A:
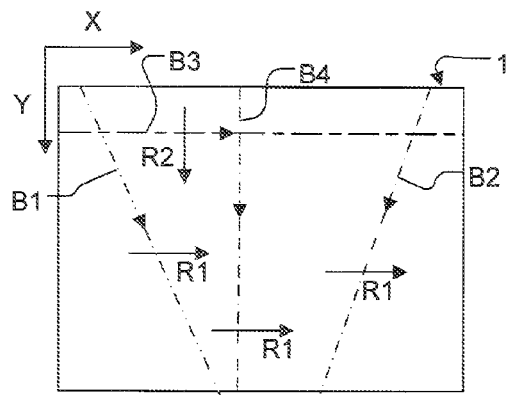
FIGS. 11A and 11B are top plan views of still another embodiment, with FIG. 11A illustrating a beam arrangement and FIG. 11B illustrating the location of different sensing portions.
Figure 11B:
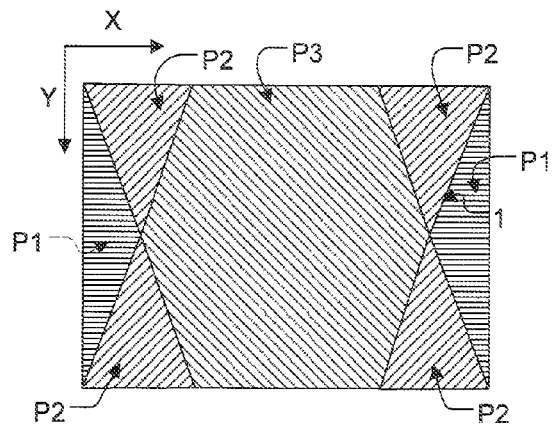

FIG. 11A illustrates a variant of the embodiment in FIG. 10A, in which one further beam B4 is additionally swept in the X direction. In the illustrated example, this beam is orthogonal to its sweep direction R2, and thus parallel to a pair of opposite sides of the panel, whereby the sensing area is extended to the entire panel 1. As shown in FIG. 11B, the sensing area comprises two first sub-portions P1, in which each point is swept by two beams, and four adjacent second sub-portions P2, in which each intersection point is formed by three beams, as well as a central third sub-portion P3, in which each intersection point is formed by four beams. In this embodiment, the equiangular beams are supplemented by an additional beam B4 in order to expand the extent of the sensing area. This expansion is achieved by sweeping a combination of a v-scan (B1 and B2) with an orthogonal beam (B4) in one direction across the panel. This combination of beams is denoted "Ψ-scan" in the following. It should also be noted, by comparing FIG. 11B and FIG. 10B, that the overall performance of the panel has been increased since all sub-portions are swept by a greater number of beams. However, there may still be differences in performance across the panel.

Figure 12A:
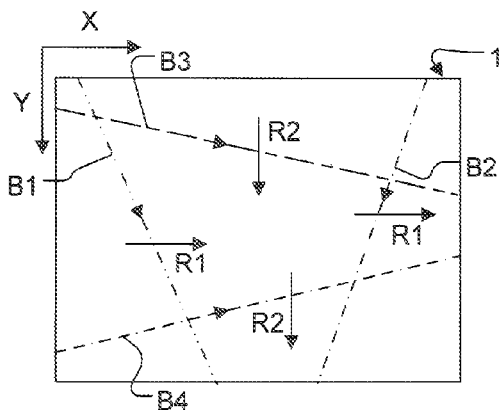
FIG. 12A is a variant of the embodiment in FIG. 9 resulting in a dual v-scan beam arrangement.
Figure 12B:
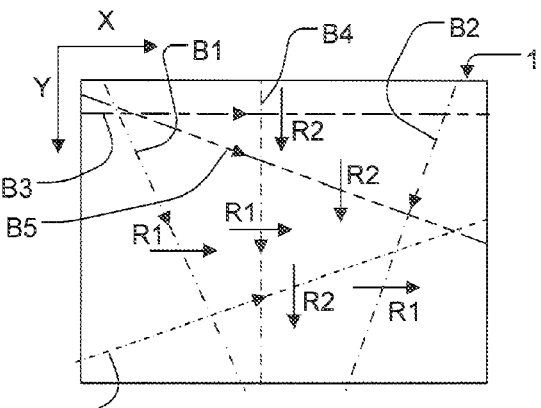
FIG. 12B is a variant of the embodiment in FIG. 11 resulting in a dual Ψ-scan beam arrangement.

FIG. 12A illustrates a variant of the embodiment in FIG. 9, wherein each of the X and Y directions is swept by two mutually non-parallel beams, i.e. a v-scan, and FIG. 12B illustrates a variant of the embodiment in FIG. 11, wherein each of the X and Y directions is swept by two mutually non-parallel beams and an orthogonal beam, i.e. a Ψ-scan.

Figure 13:
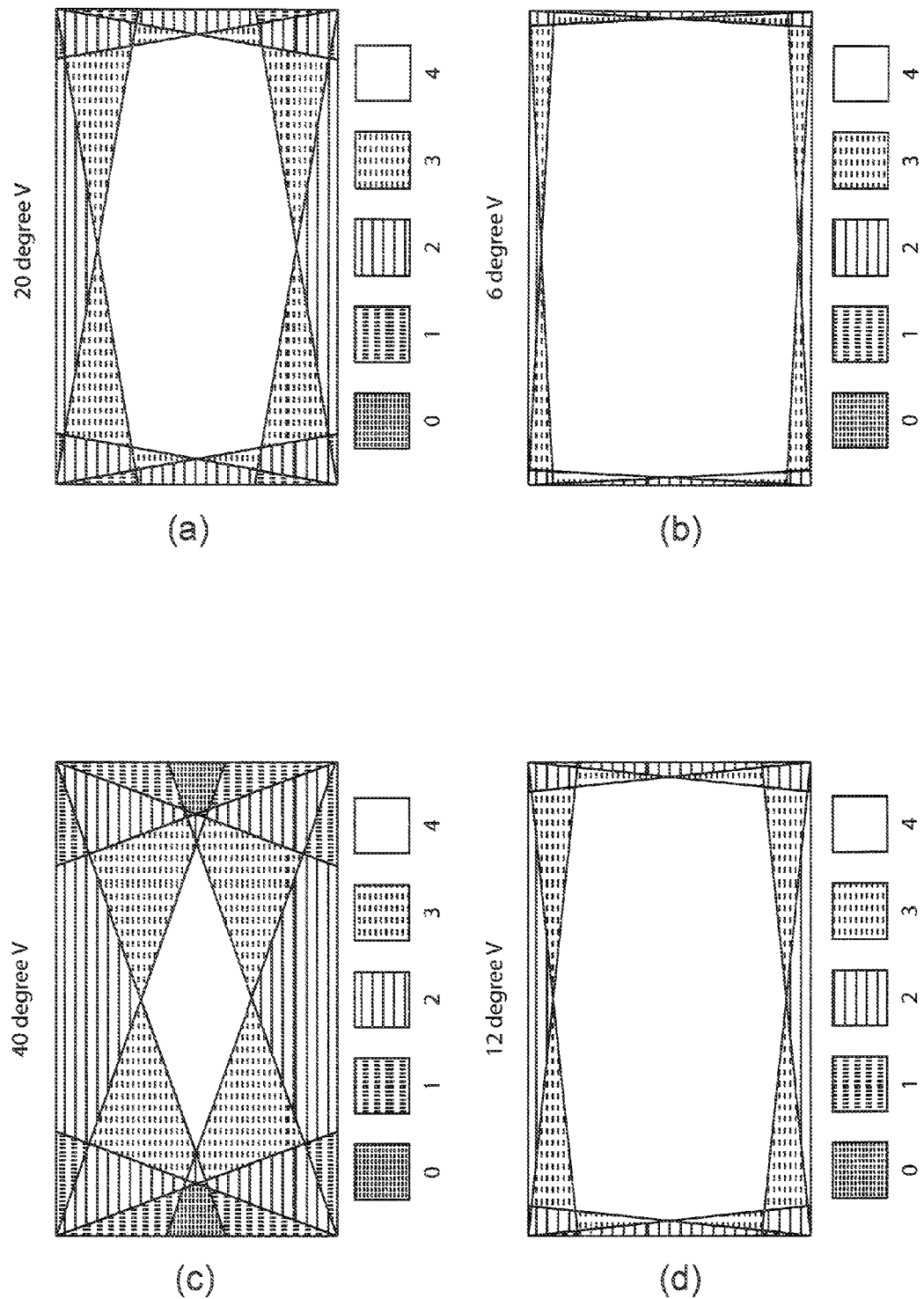
FIG. 13 illustrates the location of different sensing portions in an embodiment with a dual v-scan beam arrangement for mutual beam angles of 6°, 12°, 20° and 40°.

FIG. 13 illustrates the location of different sub-portions on a rectangular panel swept by four beams in the dual v-scan configuration shown in FIG. 12A. Specifically, FIG. 13 shows how the extent and location of these sub-portions changes when a different mutual angle is set up between the beams in each v-scan (i.e. the angle between beams B1 and B2, and between beams B3 and B4, respectively in FIG. 12A). At a mutual beam angle of about 20° (FIG. 13(a)), a major part of the panel is swept by four beams. Thus, the performance of the system is the same over a large part of the panel. Reducing the mutual beam angle further, increases the extent of the central sub-portion and decreases the size of the other sub-portions. At an angle of about 12°-15° (cf. FIG. 13(d)), there are essentially no sub-portions that are swept by less than two beams, and thus the entire panel is touch-sensitive. At an angle of about 2°-8° (cf. FIG. 13(b)), the entire panel can be considered to present an essentially uniform performance. Although the performance of the system is reduced as the mutual angle is decreased, it has been found that adequate performance can be achieved at mutual acute angles from about 2° up to about 30°.

Figure 14:
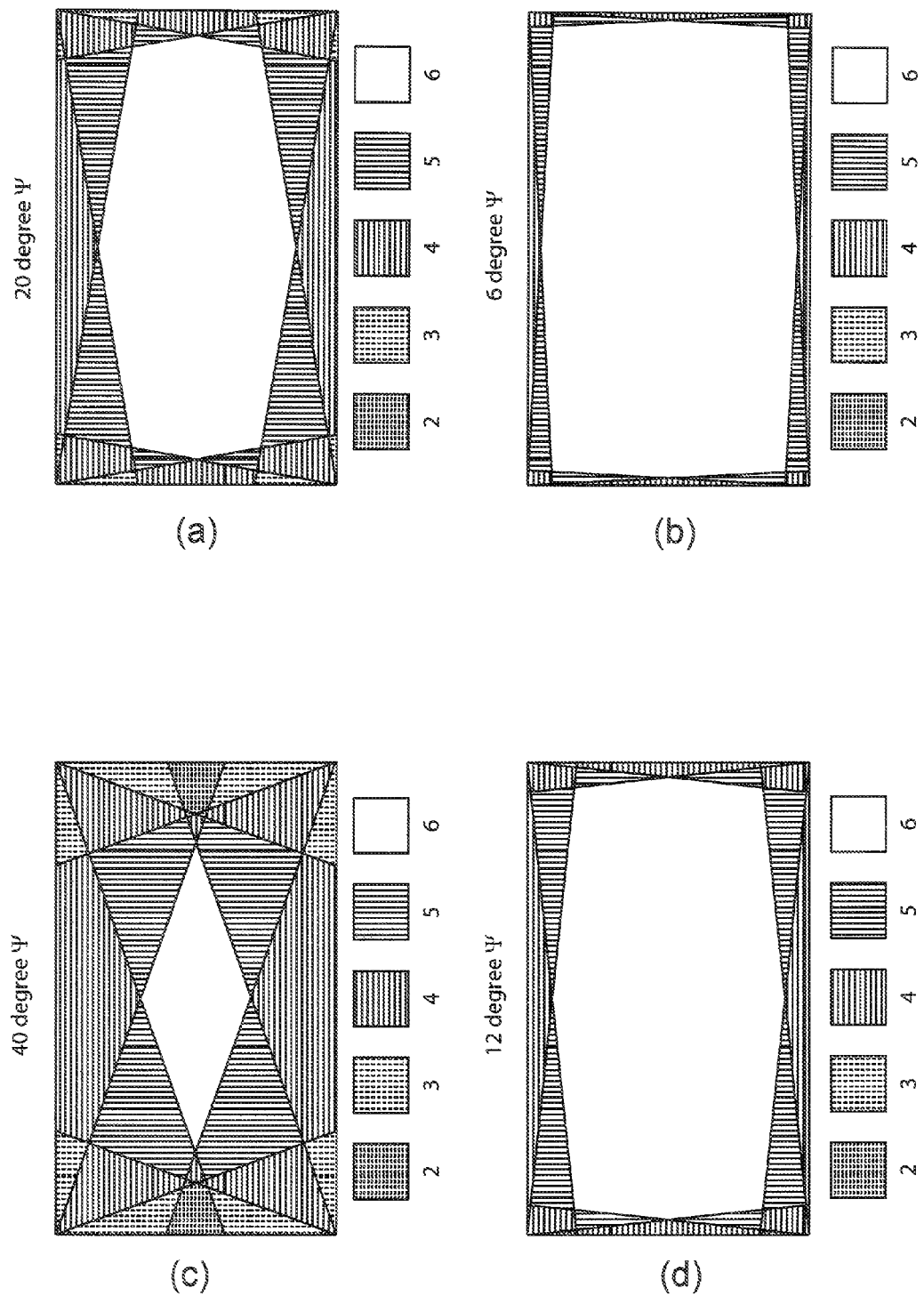
FIG. 14 illustrates the location of different sensing portions in an embodiment with a dual Ψ-scan beam arrangement for mutual beam angles of 6°, 12°, 20° and 40°.

FIG. 14 illustrates the location of different sub-portions on a rectangular panel swept by six beams in the dual Ψ-scan configuration shown in FIG. 12B. FIG. 14 shows the influence of the maximum mutual angle between the beams in each Ψ-scan (i.e. the angle between beams B1 and B2, and between beams B5 and B6, respectively in FIG. 12B). The distribution and size of the sub-portions do not differ between FIG. 14 and FIG. 13. However, with a dual Ψ-scan, each sub-portion is swept by two more beams, which serves to increase the performance of the system. For example, the ability of the system to detect multiple touches is enhanced, and already at a mutual angle of about 12°-15° (cf. FIG. 14(d)), there are essentially no sub-portions that are swept by less than four beams.

Generally, a v/Ψ-scan involves sweeping at least one set of mutually acute beams in a given sweep direction across the panel, wherein the beams included in the set have a maximum mutual acute angle of ≤30°, and preferably ≤20°. In a v-scan, there are two beams in each set, and in a Ψ-scan there are three beams in each set. In a Ψ-scan, the main direction of one of these beams is preferably orthogonal to the sweep direction.

One benefit of having the central beam in a Ψ-scan orthogonal to the sweep direction is that the central beam will be swept over the whole panel, at least if the panel is rectangular. Compared to a dual v-scan, the two central beams of a dual Ψ-scan may be swept across the entire panel, and this may result in a significant improvement in performance at the periphery of the panel.

A general advantage of using v- and Ψ-scans is that suitable performance of the touch-sensing system can be attained by sweeping only a few beams across the panel. Furthermore, both v- and Ψ-scans can be realized by space-efficient, simple and robust combinations of components, for example by the illumination and/or detection arrangements as described herein.

It has surprisingly been found that an asymmetric beam arrangement may enable determination of a greater number of touch locations for a given number of beams, and/or improve the robustness in determining touch locations. Such an asymmetric beam arrangement may be obtained by arranging at least three beams such that each pair of beams defines a unique mutual acute angle. For example, each pair of beams in a set of beams forming a Ψ-scan may have a unique mutual acute angle. In another variant, an asymmetric beam arrangement is obtained by arranging at least two beams such that they have different angles to a common sweep direction (e.g. α1≠2 in FIG. 9).

Figure 12C:
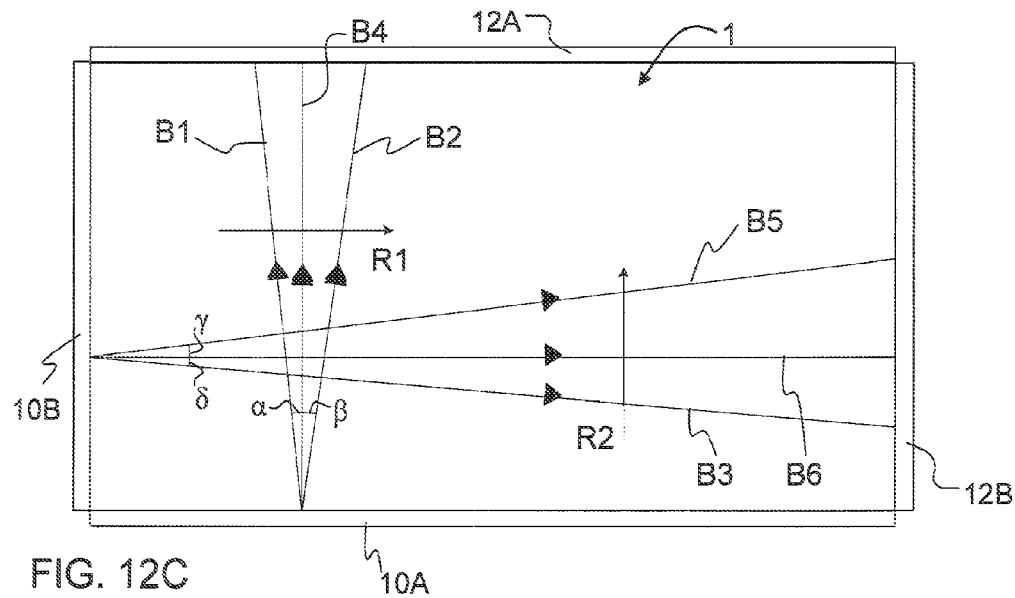
FIG. 12C illustrates an asymmetric dual Ψ-scan beam arrangement.

FIG. 12C illustrates a dual Ψ-scan arrangement that may be asymmetric by proper choice of mutual acute angles between the beams B1-B6. In the terminology of FIG. 12C, the mutual acute angles are given by α, β and (α+β) in one set of beams (B1, B2 and B4), and by γ, δ and (γ+δ) in the other set of beams (B3, B5 and B6). Thus, a suitable asymmetric beam arrangement is obtained when α≠β and/or γ≠δ. The asymmetric properties may be improved further by selecting α≠β≠γ≠δ, and even further by selecting α≠β≠γ≠δ≠(α+β)≠(γ+δ). An even more asymmetric beam arrangement is obtained when α, β, γ and δ are selected such that all mutual acute angles defined between the beams B1-B6 are unique. In one such non-limiting example, α=6°, β=8°, γ=7° and δ=5°. If the panel is rectangular, with mutually opposite long sides and short sides, the asymmetric properties may be chosen such that the set of beams (B3, B5 and B6) that is swept orthogonally to the long sides of the panel (i.e. in direction R2) has a smaller maximum acute mutual acute angle than the other set of beams (B1, B2 and B4), i.e. (γ+δ)<(α+β). Such a beam arrangement may increase the sensing area of the panel compared to other asymmetric dual Ψ-scan arrangements.

It should also be noted that any one of the beam arrangements described in the foregoing may be combined with further beams that do not comply with any one of the above design principles. For example, a set of equiangular beams may be combined with one or more further beams that are non-equiangular with the set of equiangular beams. It is also possible to combine any one of the beam arrangements described in the foregoing, e.g. a v-scan with a Ψ-scan, equiangular beams with one or more v-scans or Ψ-scans, etc.

Figure 15A:
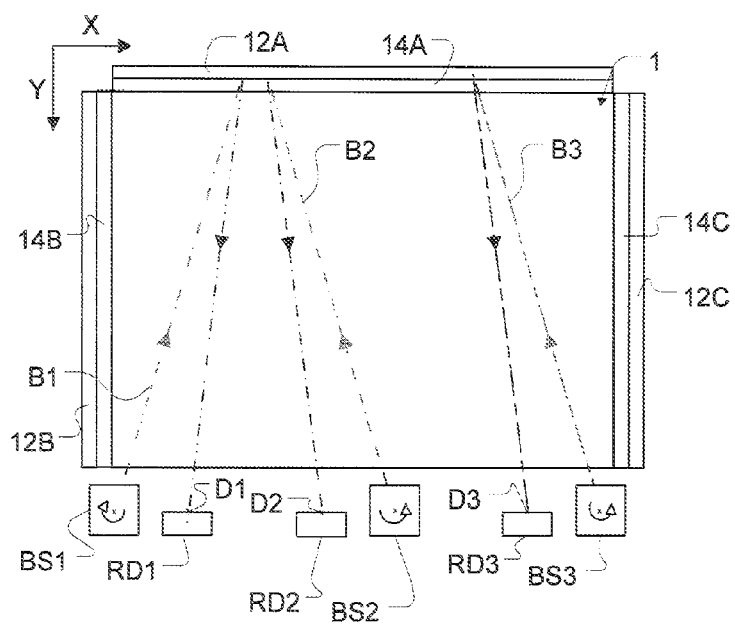
FIG. 15A is a top plan view of an embodiment with angular beam scans.

In yet another alternative embodiment, beams are swept angularly across the sensing area and around a respective axis of rotation ("angular scan"). FIG. 15A illustrates an example of such an embodiment, in which three beam scanners BS1-BS3 are arranged along one side of the panel 1 to inject a respective beam B1-B3 into the panel 1 and to sweep the beam across the sensing area. Re-directing devices 12A-12C are placed along the opposite sides of the panel 1 and configured to direct each beam B1-B3 from the panel 1 onto a fixed detection point D1-D3 while the beam is swept across the sensing area. Suitably, the beams B1-B3 only propagate through the sensing area between the re-directing devices 12A-12C and the detection points D1-D3. Between the beam scanners BS1-BS3 and the re-directing devices 12A-12C, the beams are transported outside the sensing area, e.g. beneath the panel (for example in a transportation plate to be described below). Similarly to FIG. 1, the detectors RD1-RD3 are arranged to measure the energy of the incoming beams B1-B3 in the detection points D1-D3.

Figure 15B:
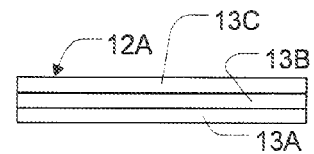
FIGS. 15B-15D are front views of re-directing elements included in the embodiment of FIG. 15A.
Figure 15C:
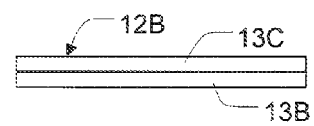
Figure 15D:
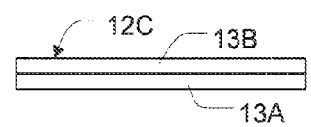

FIGS. 15B-15D are front views of the re-directing devices 12A-12C in FIG. 15A. Device 12A comprises one dedicated re-directing portion 13A-13C for each beam B1-B3, with portion 13A being designed to redirect beam B1 onto detection point D1, portion 13B being designed to redirect beam B2 onto detection point D2, and portion 13C being designed to redirect beam B3 onto detection point D3. Devices 12B, 12C comprise corresponding portions configured to redirect beams B2, B3 and B1, B3, respectively. The redirecting portions 13A-13C extend along the edges of the panel 1 and are arranged on different heights in the depth direction of the panel. The system in FIG. 15A also comprises coupling elements 14A-14C which are arranged intermediate the panel 1 and the re-directing devices 12A-12C and configured to direct each of the beams B1-B3 onto its corresponding portion 13A-13C. The redirection may be achieved by placing correctly angled mirrors at each position along the edge. In practice, this can be done with a specially molded plastic component that is transformed into a multifaceted mirror by applying a reflective coating such as gold or aluminum to one side of the plastic component. It is also possible, if the angles of the mirrors allow it, to use the surfaces of the plastic component itself as TIR mirrors. It is to be understood that the sensing area needs to be swept by at least two beams to allow for the location of a touching object to be determined, and that the precision of this determination may be increased by increasing the number of beams.

Although touch-sensing systems with angular scan are viable, it is currently believed that touch-sensing systems with pure beam translation (such as those in FIGS. 1-12) provide certain advantages. For one, the complexity of the components required to direct each beam onto a common detection point may be reduced. Furthermore, with a pure translation, the sweep speed is constant along the beam which may facilitate the analysis of the resulting measurement signals S1, S2. Still further, with an angular scan, an object that touches the panel close to a beam scanner will interact with the beam during a major part of the sweep. This means that part of the injected radiation will be absorbed/scattered over a major part of the beam sweep, thereby reducing the system's ability to detect the location of one or more further objects touching the panel. This drawback of distance dependent beam interaction is overcome when each beam is translated with an invariant main direction across the sensing area.

Further details about different beam arrangements, and systems for generating beam arrangements, are given in U.S. provisional application No. 61/129,372 and U.S. provisional application No. 61/129,373, which were both filed on Jun. 23, 2008 and which are incorporated herein by reference.

Illumination Arrangement

As discussed above in relation to FIG. 1A, the illumination arrangement may include a beam scanner BS1, BS2 which generates and sweeps a beam B1, B2 along an elongate fixed beam-directing element 10A, 10B that is designed and arranged to output the beam with a desired main direction in the plane of the touch surface.

Generally, the beam-directing device 10A, 10B is an element or assembly of elements which defines the output direction of the beam for a given input direction thereof. To limit the footprint of the touch-sensing system, the beam-directing device 10A, 10B may be placed near a periphery portion of the panel 1. For reasons of robustness and mounting precision, the re-directing device may be mounted in contact with such a periphery portion.

Figure 16:
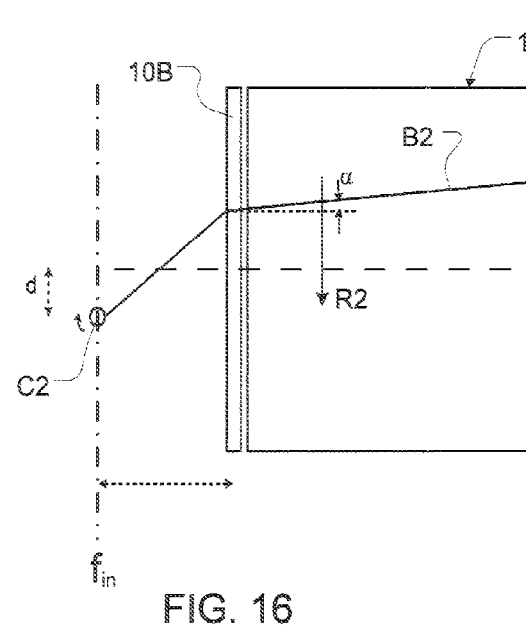
FIG. 16 is a top plan view of a touch sensing system to illustrate operating principles of an illumination arrangement.

In one embodiment, the beam-directing device 10A, 10B is an optical device that defines a focal plane parallel to and at a distance from an input side of the optical device. Thus, all rays that originate from a point in the focal plane and impinge on the input side of the optical device will be output in the same direction. FIG. 16 illustrates such an illumination arrangement, in which an angular scan is generated by sweeping a beam around a rotational axis C2 located in the focal plane $f_{in}$ of the beam-directing device 10B. The angular scan results in the beam being swept along the beam-directing device 10B, which converts the angular scan to a linear translation of the beam in a direction parallel to the beam-directing device 10B. As indicated, the angle α between the main direction of the output beam and the optical axis of the beam-directing device 10B is given by the displacement d of the rotational axis C2 from the focal point of the optical device 10B (given by the intersection between the focal plane $f_{in}$ and the optical axis of the optical device 10B).

In the example of FIG. 16, the optical beam-directing device 10B is a lens device that transmits and redirects the incoming radiation. The lens device may be made up of diffractive optical elements (DOE), micro-optical elements, refractive lenses and any combination thereof. In one presently preferred embodiment, the lens device is a Fresnel lens.

The lens device 10B in FIG. 16 can be used to sweep a plurality of beams across the touch surface in the same sweep direction but with different main directions. This can be accomplished by arranging the rotational axes of a plurality of angular scanning beams at different locations in the focal plane of the lens device. Such an embodiment is shown in FIG. 17, in which three beam scanners BS1-BS3 are arranged with their rotational axes C1-C3 in the focal plane $f_{in}$. FIG. 17 shows each beam B1-B3 at three time points while it is swept along the lens device 10B, indicating that the main direction of each beam is unchanged during the sweep. FIG. 17 also illustrates that each of the beams B1-B3 are received by the detection arrangement and re-directed onto a respective detector RD1-RD3, as described in the foregoing. It is to be understood that the illumination arrangement in FIG. 17 may be space-efficient, simple, robust and easy to assemble while providing a well-defined mutual angle between the beams. Further, it allows the beams B1-B3 to be swept concurrently across the sensing area, if desired.

FIG. 18A illustrates an alternative embodiment in which a single beam scanner BS2 is configured to generate two angular scans around a corresponding number of virtual rotational axes C1, C2. Like in the embodiment of FIG. 17, the rotational axes C1-C2 are arranged in the focal plane $f_{in}$ of the lens device 10B, whereby the angular scans are converted to linear translations of two non-parallel beams B1, B2 with a well-defined mutual angle.

FIG. 18B illustrates an embodiment of such a beam scanner BS2 for generating two virtual rotation axes C1, C2. A stationary emitter 20 is operated to emit a beam which hits a rotating mirror 21. As the mirror 21 turns in the direction of the arrow around its axis of rotation, the beam is first deflected onto and swept along mirror 22, which reflects the beam as if it was swept around virtual rotation axis C1, and then deflected onto and swept along minor 23, which reflects the beam as if it was swept around virtual rotation axis C2.

Figure 19A:
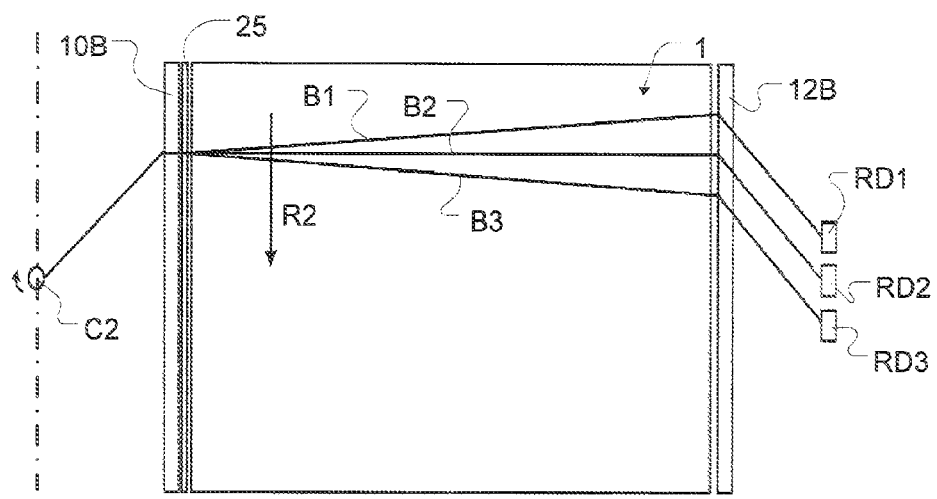
FIG. 19A-19C are top plan views of alternative embodiments of illumination arrangements for touch-sensing systems.

FIG. 19A illustrates an alternative or supplementary configuration of an illumination arrangement for generating a linear translation of a set of beams B1-B3 with well-defined mutual angles. In the embodiment of FIG. 19A, an angular scan is generated around a rotation axis C2 located in the focal plane of a lens device 10B. The output beam of the lens device 10B, which suitably has an essentially invariant main direction, is received by a transmission grating 25, which generates a zero-order beam B2 as well as first-order beams B1, B3 on the sides of the zero-order beam. Although not shown on the drawings, the grating may be designed to generate beams of higher orders as well. The mutual angles between the different beams B1-B3 are determined by the properties of the grating 25 according to the well-known grating equation:

$$d_s \cdot (\sin \theta_m + \sin \theta_i) = m \cdot \lambda,$$

with $d_s$ being the spacing of diffracting elements in the grating, $\theta_i$ being the angle of incidence of the beam that impinges on the grating, m being the order, λ being the wavelength of the radiation, and $\theta_m$ being the angle between each the beam of order m and the normal direction of the grating. This grating equation is generally applicable to all types of gratings.

Figure 19B:
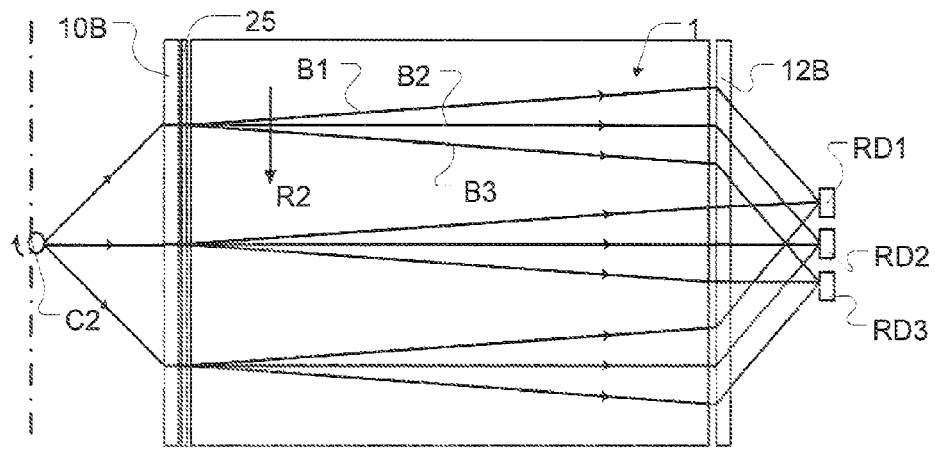
Figure 19C:
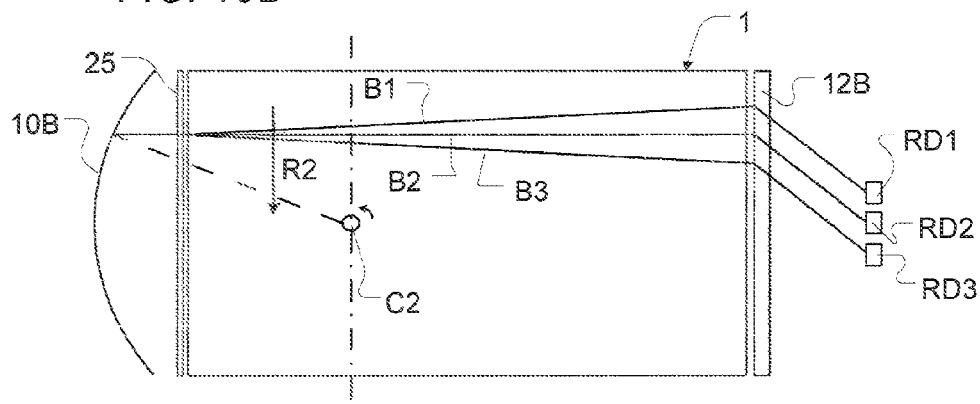
Figure 19D:
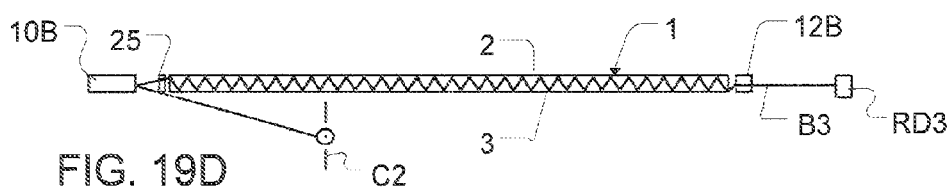
FIG. 19D is an elevated side view of the system in FIG. 19C.

FIG. 19B illustrates the main direction of the generated beams B1-B3 at three different time points during a sweep in the system of FIG. 19A. FIG. 19B also illustrates that each of the beams B1-B3 are received by the detection arrangement and re-directed onto a respective detector RD1-RD3, as described in the foregoing.

The use of a grating 25 in combination with a lens device 10B provides an illumination arrangement with the potential of being space-efficient, simple, robust and easy to assemble while providing a well-defined mutual angle between the beams. Further, it allows the beams B1-B3 to be swept concurrently across the sensing area, if desired. It is to be understood that further beam directions may be generated by providing more than one angular scan and arranging the rotational axes of the angular scans in the focal plane $f_{in}$ of the beam-directing device 10B, e.g. as shown in FIGS. 16-18.

In the illustrated embodiments, the grating 25 is arranged downstream of the lens device 10B. This will cause the grating 25 to be swept by a beam with an essentially invariant main direction, so that the set of beams B1-B3 generated by the grating 25 are also swept with essentially invariant main directions within the sensing area. However, the grating 25 may alternatively be arranged upstream of the lens device 10B, if the detection arrangement is configured to accept larger variations in the main directions of the beams B1-B3 during the sweep.

As an alternative to a transmission grating, a reflective grating may be used.

As an alternative or complement to a grating, the lens device 10B may itself be configured to generate a set of output beams with well-defined mutual angles, based on a single input beam. Such a lens device 10B may comprise a set of elongate lens segments (not shown) arranged on top of each other in the depth direction, where each lens segment is arranged to generate an output beam in a unique direction, when swept by an input beam of at least the same width as the lens device 10B in the depth direction. In one implementation, the focal points of the different lens segments may be located at different positions in the input focal plane $f_{in}$. For example, the lens segments may all be designed from a basic lens segment which is shifted in its longitudinal direction to form the different segments of the lens device 10B. Instead of being arranged on top of each other, the lens segments may be superimposed on each other in the beam-directing device 10B.

Figure 23:
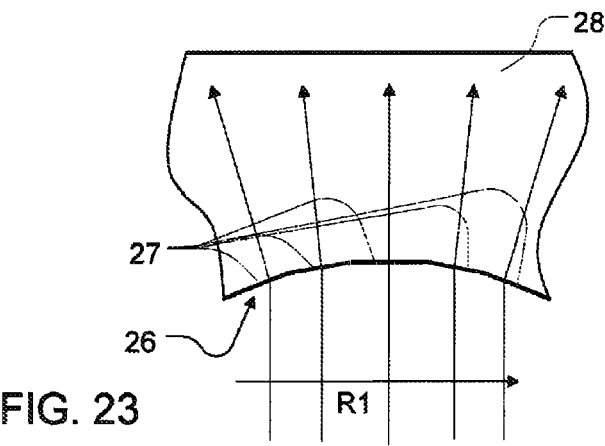
FIG. 23 is a plan view of a recurring prism element in a prism structure for generating a set of beams of different main directions from a single swept beam.

As yet another alternative or complement to a grating, an elongate prism structure may be arranged intermediate the lens device 10B and the panel edge/coupling element, wherein the prism structure comprises a repeating prism element in the longitudinal direction. FIG. 23 illustrates an example of such a prism element 26, which has five differently inclined, planar prism surfaces 27, whereby the input beam is directed in five different directions as it is swept (in direction R1) along the prism structure. In the illustrated example the prism element 26 is formed as an indentation in a surrounding material 28. Alternatively, the prism element 26 may be formed as a projection from the surrounding material 28. The prism structure may be provided as a separate component, or it may be integrated in the panel edge or the coupling element.

It is to be noted that, in all of the above-described illumination arrangements, the lens device 10B may be replaced by a fixed mirror device that redirects the incoming radiation by reflection. The mirror device may be made up of diffractive optical elements (DOE), micro-optical elements, mirrors and any combination thereof. An example of such a mirror device 10B, combined with a transmission grating 25, is shown in FIG. 19C-19D, in which an angular scan is generated around a rotational axis C2 located in the focal plane $f_{in}$ of the mirror device 10B. The above discussion with respect to the lens device is equally applicable to such a mirror device.

It is to be understood that the above-mentioned grating 25 may be integrated with the beam-directing device 10B, be it a lens device or a mirror device.

Further, in all illumination arrangements described herein, the beam scanner(s) may be of any known type and configuration and may operate in any suitable wavelength range, e.g. in the infrared or visible wavelength region. All beams could be generated with identical wavelength. Alternatively, different beams could be generated with radiation in different wavelength ranges, permitting differentiation between the beams based on wavelength. Furthermore, the beam scanner(s) can output either continuous or pulsed radiation. The beams could be generated by one or more radiation sources, which can be any type of device capable of emitting radiation in a desired wavelength range, for example a diode laser, a VCSEL (vertical-cavity surface-emitting laser), or alternatively an LED (light-emitting diode), an incandescent lamp, a halogen lamp, etc. Preferably, the illumination arrangement is configured such that the beam, when injected into the panel, is essentially collimated in the plane of the panel. This will maximize the amount of radiation that reaches the radiation detector at the opposite end of the sensing area.

In the hitherto illustrated embodiments, the beam scanners and/or detectors have been placed outside the perimeter of the panel. This might be undesirable, e.g. if the touch-sensing system is to be integrated with the above-mentioned interface device, e.g. display device, such as an LCD (Liquid Crystal Display), a plasma display, an OLED (Organic Light-Emitting Diode) display or similar If components of the touch-sensing system are arranged far from the perimeter of the display, the surface area of the complete system may become undesirably large.

Figure 20A:
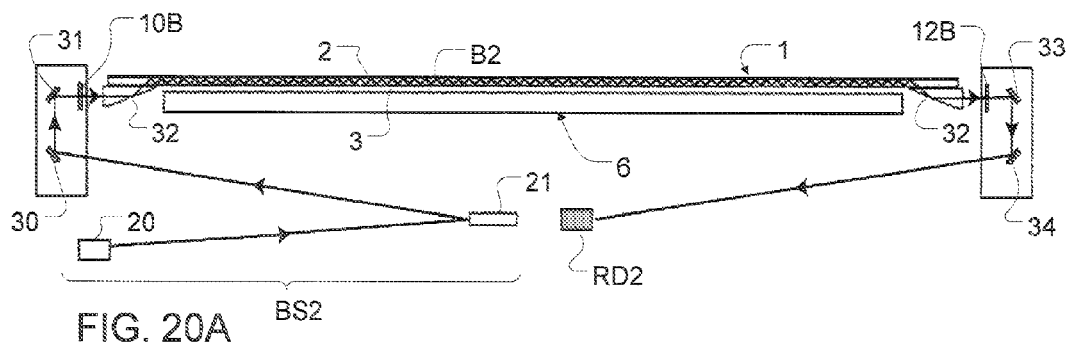
FIG. 20A-20B are section views of embodiments with folded beam paths.

FIG. 20A is a section view of an embodiment with folded beam paths, thereby allowing beam scanners and detectors to be placed underneath the panel and the interface device, if present. The illustrated touch-sensing system comprises two folding systems, which are arranged on opposite sides of the panel 1. In the system of FIG. 20A, a beam is emitted from emitter 20 to hit rotating mirror 21, which reflects the beam towards the first folding system. After entering the first folding system, the beam is first reflected in stationary mirror 30 and thereafter in stationary mirror 31, whereby the beam is folded into the plane of the panel. The folded beam then passes through the beam-directing lens device 10B and enters the panel via a coupling element 32, which may be attached to the panel 1, e.g. with optically clear glue or any other kind of suitable adhesive. The beam propagates through the panel by TIR and exits the panel via coupling element 32.

Thereafter, the beam enters the second folding system, wherein it passes through the re-directing lens device 12B and is reflected in stationary mirrors 33, 34, such that the beam is again folded beneath the panel 1. The beam thereafter exits the second folding system and is received by the radiation detector RD2.

Figure 20B:
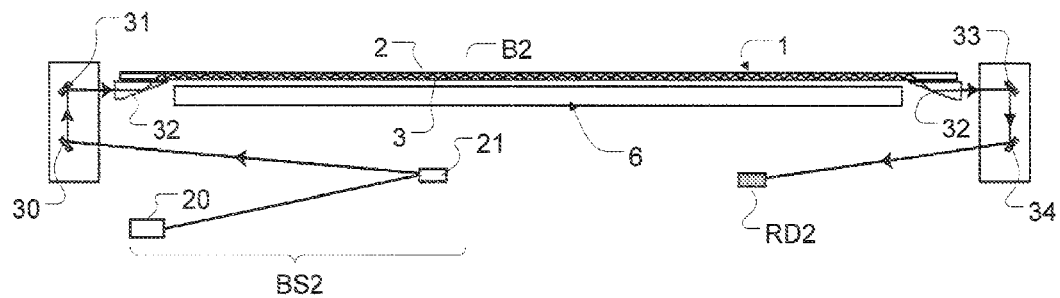

FIG. 20B is a variant of the system in FIG. 20A, in which a mirror device is used instead of a lens device for controlling the main direction of the beam B2 in the sensing area and for directing the beam onto the detector RD2. Thus, one or both of stationary mirrors 30, 31 in the first folding system on the input side may be configured to implement the beam-directing functionality of the illumination arrangement, and one or both of stationary mirrors 33, 34 in the second folding system on the output side may be configured to implement the re-directing functionality of the detection arrangement.

Although not shown on the drawings, it should be understood that other combinations of the folding systems in FIGS. 20A and 20B are conceivable.

In all embodiments, the touch-sensing system may include a transportation device, which is arranged underneath the panel to define a confined transportation channel in the illumination arrangement between the beam scanner and the beam injection site on the panel, and/or in the detection arrangement between the beam out-coupling site on the panel and the scanning detector. The use of such transportation device makes it possible to gather the bulk of components at one or a few sides of the panel. Preferably, the transportation device has no anti-glare structure, so as to minimize scattering of radiation inside the transportation device. Further, if the panel is provided with an anti-glare structure, it is preferred to include the transportation device in the illumination arrangement, rather than in the detection arrangement, since this will minimize the width of the beam profile at the detector.

Figure 21A:
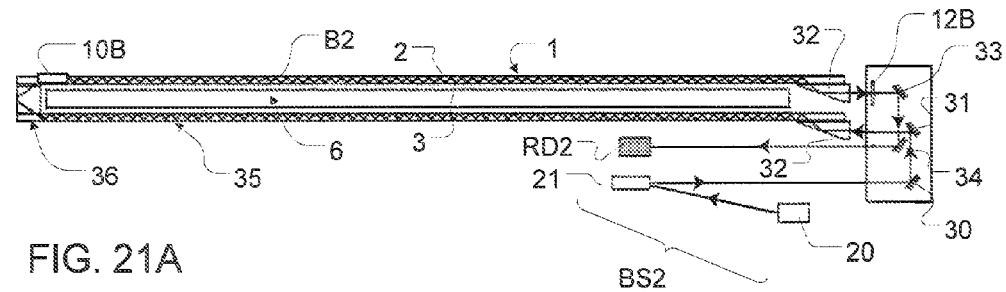
FIGS. 21A-21B are section views of embodiments that include a transportation plate underneath the touch-sensitive panel.
Figure 21B:
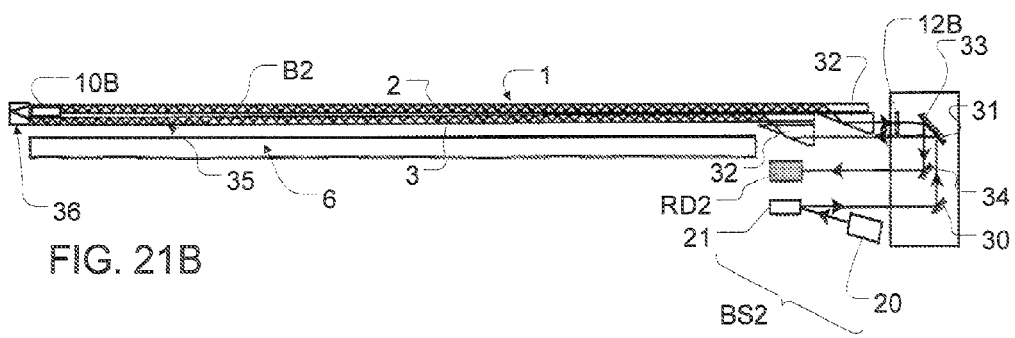
Figure 22:
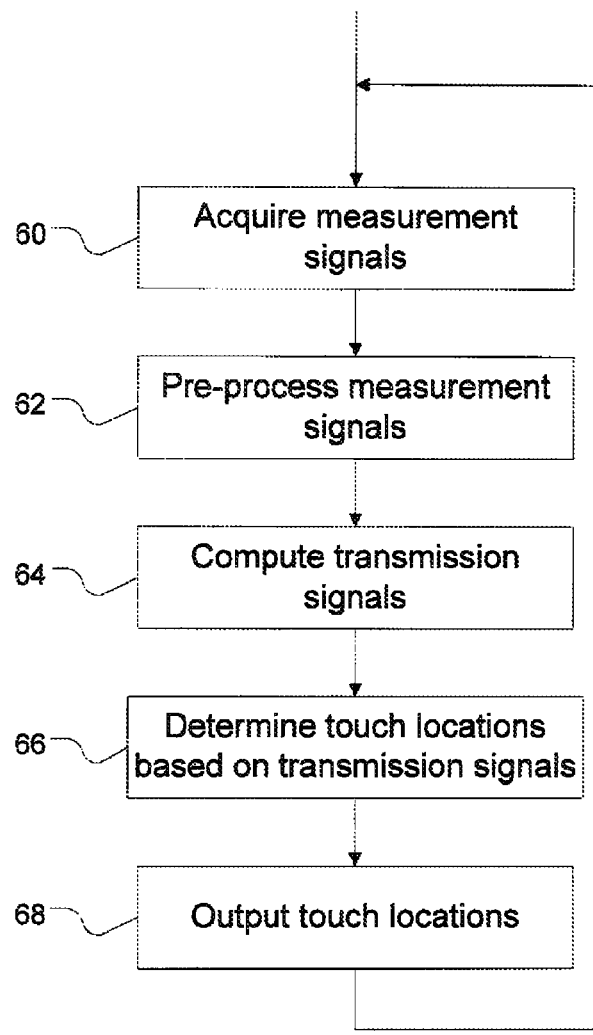
FIG. 22 is a flow chart of an exemplifying method for determining touch locations in a touch-sensing system.

FIGS. 21A and 21B illustrate variants of the embodiment in FIG. 20A, wherein a transportation device is incorporated in the form of a transportation plate 35, which may be made of the same material as the panel or any other sufficiently radiation-transmissive material or combination of materials. The transportation plate 35 suitably has an extent to allow for the above-mentioned beams to be swept within the plate and may have essentially the same size as the panel. In FIG. 21A, the transportation plate 35 is spaced from the panel 1, e.g. to accommodate for an interface device 6 to be placed between the panel 1 and the plate 35. In FIG. 21B, the plate 35 is placed in contact with the panel 1, or may be formed as an integrated layer in the panel 1. In both examples, the touch-sensing system includes a distal folding system 36 that directs the beam from the transportation plate 35 into the panel 1. In the example of FIG. 21, the beam-directing device 10B is included in the distal folding system 36. This will minimize the distance between the beam-directing device 10B and the re-directing device 12B which may reduce the impact of inaccuracies in the beam-directing device 10B or beam scanner BS2 on the ability of the re-directing device 12B to correctly direct the beam B2 onto the detector RD2. It may also reduce the footprint of the system.

Generally, the use of a transportation plate 35 may provide a touch-sensing system, which is simple, compact, robust and easy to assemble. The beam may be confined within the plate by total internal reflection, and/or by the plate being coated with one or more reflecting layers. In alternative embodiments (not shown), the touch-sensing system may comprise more than one transportation device. For example, the individual beams may be guided in separate transportation devices, or the system may include one or more transportation devices for guiding the beams to the panel and one or more transportation devices for guiding the beams from the panel. Other types of transportation devices may alternatively be used, such as optical fibres.

Determination of Touch Locations

In all of the above-described embodiments, configurations, arrangements, alternatives and variants, a data processor (8 in FIG. 1A) may be configured to calculate the touch locations based on measurement signals derived from the radiation detectors. The skilled person will readily realize that there are numerous methods for determining the touch locations. FIG. 19 is a flow chart of one such exemplifying method.

In step 60, measurement signals are acquired from the detectors in the system. Each measurement signal represents data from k different angles, sampled at N time intervals during a sensing instance.

In step 62, the measurement signals are pre-processed. For example, the measurement signals may be processed for noise reduction using standard filtering techniques, e.g. low-pass filtering, median filters, Fourier-plane filters, etc. Furthermore, if the energy of the emitted beams is measured in the system, the measurement signals may be compensated for temporal energy fluctuations in the beam scanners. Furthermore, the measurement signals may contain sensor readings from outside the region of interest, e.g. outside the sensing area of the panel. Thus, the measurement signals may be pre-processed by extracting relevant parts thereof. It may be desired to add one or more trigger points in the measurement signal to improve/facilitate the extraction of relevant data. Such a trigger point may indicate the start or stop of a beam sweep. Furthermore, the measurement signals may be rectified, i.e. converted to have equidistant sampling distance in the panel coordinate system. Such a rectification may include interpolating each measurement signal with a non-linear angle variable, resulting in a data set with samples that are evenly distributed over the panel. Rectification is optional, but may simplify the subsequent computation of touch locations.

In step 64, a transmission signal is calculated for each pre-processed measurement signal, by dividing the measurement signal with a background signal. The background signal may or may not be unique to each detector or each measurement signal. The background signal may be pre-set, derived during a separate calibration step, or derived from measurement signals acquired during one or more preceding iterations. Optionally, the calculation of transmission signals may include calculating the logarithm of the ratios between the measurement and background signals.

In step 66, the touch locations are determined based on the transmission signals. The touch-sensing systems as described herein may be modeled using known algorithms developed for transmission tomography with either a parallel scanning geometry or a fan beam geometry. Thus, the touch locations may be reconstructed using any available image reconstruction algorithm, especially few-view algorithms that are used, e.g., in the field of tomography. If the system involves scattering, the reconstruction suitably also takes into account the functional dependence between signal width and position along the panel (cf. FIG. 8).

The determination of touch locations in step 66 may thus involve identifying peaks in the transmission signals, while possibly also separating adjacent/overlapping peaks (cf. FIG. 7); reconstructing the beams that correspond to the identified peaks, and identifying candidate intersections between the reconstructed beams in the sensing area; computing an area value indicative of the (logarithmic) integrated area under each identified peak in the transmission signals, and setting up an equation system relating the candidate intersections to the area values; and then using e.g. linear programming to identify the most likely set of touches from the set of candidates. The accuracy and/or computation speed of step 66 may be increased by using a priori knowledge about the touch locations, e.g. by using information about the touch locations that were identified during preceding sensing instance(s).

To give a simplified example, based on the measurement signals in FIG. 7, the peaks in signal S1 may yield logarithmic areas $\alpha 1$, $\alpha 2$ and the peak in S2 may yield logarithmic area $\alpha 3$. Beam reconstruction may yield two intersections p1, p2, giving the equation system:

$$\begin{cases} p1 = a1 \\ p2 = a2 \\ p1 + p2 = a3 \end{cases}$$

In this particular example, the solution is trivial, but it should be realized that the provision of multiple touches and comparatively few beam sweeps may result in an equation system that has a number of possible solutions, or no solution, requiring the use of optimization methodology to derive the most likely set of touches.

After step 66, the determined touch locations are output and the method returns to step 60 for processing of a forthcoming sensing instance.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the illumination arrangement may combine sweeping of one or more beams of radiation with other means for generating radiation paths inside the panel, e.g. activating opposite pairs of fixed beam transmitters and beam detectors as disclosed in aforesaid U.S. Pat. No. 3,673,327, or using a combination of fixed light sources for generation of diverging beams and arrays of light sensors arranged at the periphery of the panel as disclosed in aforesaid US2004/0252091.

Further, one or more of the optical components described in the foregoing may be combined into a single optical unit, or the functionality of a single optical component described in the foregoing may be provided by a combination of components. For example, it is conceivable to integrate the beam-directing device or the re-directing device into the coupling element for coupling radiation into the panel, or into the panel edge.

The invention claimed is:

1. An apparatus for determining a location of at least one object on a touch surface, said apparatus comprising:
   a panel-defining the touch surface and an opposite surface;
   an illumination arrangement adapted to introduce radiation into the panel for propagation by internal reflection between the touch surface and the opposite surface, so as to generate a grid of intersecting radiation paths in a sensing area;
   a detection arrangement adapted to measure the transmitted energy in said radiation paths; and
   a data processor connected to the detection arrangement and configured to determine, based on the measured energy, said location based on an attenuation of two or more radiation paths caused by the object touching the touch surface within the sensing area;
   wherein said illumination arrangement is configured to generate at least a subset of the radiation paths by sweeping at least one beam of radiation along the touch surface, a propagation direction of the at least one beam of radiation within the panel being non-perpendicular to the sweeping direction of the at least one beam of radiation;
   wherein said detection arrangement comprises a fixed re-directing device configured to receive and re-direct said at least one beam onto a common detection point while said at least one beam is swept along the touch surface; and
   wherein said detection arrangement further comprises a radiation detector which is located at said common detection point to measure the energy of said at least one beam.

2. The apparatus of claim 1, wherein the illumination arrangement is configured to sweep said at least one beam with an essentially invariant main direction within the sensing area.

3. The apparatus of claim 1, wherein the fixed re-directing device comprises an elongate optical element that defines an output focal plane, wherein the illumination arrangement is configured such that the beam, while being swept within the sensing area, is swept along the elongate optical element at an essentially invariant angle of incidence, and wherein the radiation detector is arranged in said output focal plane.

4. The apparatus of claim 3, wherein the illumination arrangement is adapted to sweep at least two separate beams of radiation within the sensing area, such that each beam is swept along the elongate optical element at a respective angle of incidence, and wherein the detection arrangement comprises at least two radiation detectors, which are arranged at separate locations to measure the energy of the respective beam.

5. The apparatus of claim 1, wherein the radiation detector comprises a light-sensing surface and device for increasing the effective light-sensing area of the radiation detector, said device being arranged intermediate the re-directing device and the light-sensing surface.

6. The apparatus of claim 5, wherein said device for increasing the effective light-sensing area comprises one of a diffusing element and a concentrator.

7. The apparatus of claim 1, wherein the re-directing device is arranged to extend along an edge portion of said panel.

8. The apparatus of claim 1, wherein the illumination arrangement is configured to inject beams that are collimated at least in the plane of the panel.

9. The apparatus of claim 1, wherein the illumination arrangement and the detection arrangement are configured to introduce and receive said at least one beam on opposite ends of the sensing area.

10. The apparatus of claim 1, wherein the illumination arrangement comprises a beam-scanning device configured to sweep an input beam around an axis of rotation, a fixed beam-directing device configured to receive the thus-swept input beam and generate at least one output beam which is translated in a principal direction while having an essentially invariant main direction, and a coupling element connected to the panel for receiving and injecting said at least one output beam into the panel, thereby forming said at least one beam that is swept along the touch surface-within the sensing area.

11. The apparatus of claim 10, wherein the beam-directing device comprises an elongate optical element that defines an input focal plane, wherein said axis of scanning is located in said input focal plane.

12. The apparatus of claim 10, wherein the beam-scanning device is configured to sweep at least two separate input beams along the elongate optical element, each input beam being swept around a separate axis of rotation in said input focal plane, thereby causing the elongate optical element to generate output beams with separate main directions.

13. The apparatus of claim 10, wherein the beam-directing device further comprises an elongate grating structure which is arranged to generate said at least one output beam as a set of diffracted beams with a predetermined angular spacing.

14. The apparatus of claims 10, wherein the beam-directing device is arranged to extend along an edge portion of said panel.

15. The apparatus of claim 14, wherein said principal direction is essentially parallel to said edge portion of said panel.

16. The apparatus of claims 10, wherein the illumination arrangement comprises a plate-shaped radiation guide which is arranged underneath the panel, as seen from the touch surface, and a beam-folding system which is arranged to optically connect the radiation guide to the panel, wherein the radiation guide is configured to guide said at least one output beam by internal reflection from the beam-directing device to the beam-folding system.

17. The apparatus of claim 1, wherein the illumination arrangement is configured to sweep a first set of mutually acute beams in a first principal direction across the panel, wherein the beams in the first set have a maximum mutual acute angle of ≤30°, and preferably ≤20°.

18. The apparatus of claim 17, wherein the main direction of one of the beams in the first set is orthogonal to the first principal direction.

19. The apparatus of claim 17, wherein each pair of beams in the first set has a unique mutual acute angle.

20. The apparatus of claim 17, wherein the illumination arrangement is configured to sweep at least one second beam in a second principal direction across the panel.

21. The apparatus of claim 17, wherein the illumination arrangement is configured to sweep a second set of mutually acute beams in a second principal direction across the panel, wherein the beams in the second set have a maximum mutual acute angle of ≤30°, and preferably ≤20°.

22. The apparatus of claim 21, wherein the first set comprises three beams and/or the second set comprises three beams.

23. The apparatus of claim 21, wherein the main direction of one of the beams in the second set is orthogonal to the second principal direction.

24. The apparatus of claim 21, wherein each pair of beams in the second set has a unique mutual acute angle.

25. The apparatus of claim 20, wherein the first and second principal directions are mutually orthogonal.

26. The apparatus of claim 20, wherein the panel is rectangular, and the first and second principal directions are parallel to a respective edge portion of the panel.

27. A method of determining a location of at least one object on a touch surface, said touch surface being part of a panel that defines the touch surface and an opposite surface, said method comprising the steps of:
introducing radiation into the panel for propagation by internal reflection between the touch surface and the opposite surface, so as to generate a grid of intersecting radiation paths in a sensing area;
measuring the transmitted energy in said radiation paths;
identifying, based on the measured energy, at least two radiation paths that are attenuated by an object touching the touch surface; and
determining the location of the object based on the attenuated radiation paths;
wherein the step of introducing comprises sweeping at least one beam of radiation along the touch surface, a propagation direction of the at least one beam of radiation within the panel being non-perpendicular to the sweeping direction of the at least one beam of radiation;
wherein the step of measuring comprises receiving said at least one beam, while it is swept along the touch surface, by a fixed re-directing device which re-directs said at least one beam onto a common detection point, and measuring the energy of said at least one beam at said common detection point.

28. A method of operating an apparatus for determining a location of at least one object on a touch surface, said touch surface being part of a panel that defines the touch surface and an opposite surface, said method comprising the steps of:
operating an illumination arrangement to introduce radiation into the panel for propagation by internal reflection between the touch surface and the opposite surface, so as to generate a grid of intersecting radiation paths in a sensing area;
operating a detection arrangement to measure the transmitted energy in said radiation paths; and
determining, based on the transmitted energy, said location based on an attenuation of two or more radiation paths caused by the object touching the touch surface within the sensing area;
wherein the step of operating the illumination arrangement comprises the step of sweeping at least one beam of radiation along the touch surface, such that said at least one beam, after passing the sensing area, is received by a fixed re-directing device which re-directs said at least one beam onto a common detection point, a propagation direction of the at least one beam of radiation within the panel being non-perpendicular to the sweeping direction of the at least one beam of radiation; and
wherein the step of operating the detection arrangement comprises measuring the energy of said at least one beam by a radiation detector which is located at the common detection point.

29. A non-transitory computer readable medium comprising computer code which, when executed on a data-processing system, is adapted to carry out the method of claim 28.

* * * * *